US012767031B2

(12) United States Patent
Kendall et al.

(10) Patent No.: US 12,767,031 B2
(45) Date of Patent: Oct. 20, 2026

(54) FRAME FOR A VEHICLE

(71) Applicant: Victorian Hydraulics Pty Ltd, Moorabbin (AU)

(72) Inventors: Jeffrey Kendall, Nairne (AU); Simon Jeffrey Kendall, Minders Rest (AU)

(73) Assignee: Victorian Hydraulics Pty Ltd, Moorabbin (AU)

( * ) Notice: Subject to any disclaimer, the term of this patent is extended or adjusted under 35 U.S.C. 154(b) by 1092 days.

(21) Appl. No.: 18/250,900

(22) PCT Filed: Oct. 28, 2020

(86) PCT No.: PCT/AU2020/051159
§ 371 (c)(1),
(2) Date: Apr. 27, 2023

(87) PCT Pub. No.: WO2021/087553
PCT Pub. Date: May 14, 2021

(65) Prior Publication Data
US 2023/0406187 A1 Dec. 21, 2023

(30) Foreign Application Priority Data
Nov. 8, 2019 (AU) ................................ 2019904215

(51) Int. Cl.
*B60P 1/00* (2006.01)
*B60P 1/16* (2006.01)
(Continued)

(52) U.S. Cl.
CPC ................. *B60P 1/16* (2013.01); *B60P 1/283* (2013.01); *F16B 7/14* (2013.01); *F16B 39/12* (2013.01); *F16B 39/34* (2013.01)

(58) Field of Classification Search
CPC .... B60P 1/16; B60P 1/283; F16B 7/14; F16B 39/12; F16B 38/34
(Continued)

(56) References Cited

U.S. PATENT DOCUMENTS

| | | |
|---|---|---|
| 4,412,699 A | 11/1983 | Peruzzi |
| 2004/0018076 A1 | 1/2004 | Poindexter |

(Continued)

FOREIGN PATENT DOCUMENTS

| | | |
|---|---|---|
| FR | 546141 | 10/1922 |
| GB | 143342 | 5/1920 |
| GB | 275173 | 8/1928 |

*Primary Examiner* — Steven O Douglas
(74) *Attorney, Agent, or Firm* — Levine Bagade Han LLP

(57) ABSTRACT

An assembly to be mounted on a vehicle to support a load receiving body on the vehicle. The vehicle having a forward direction of travel with the load receiving body being tiltable. The assembly including a primary frame, having a longitudinal axis X, that is to be attached to the vehicle. A secondary frame extending between the primary frame and to be attached to the load receiving body. A hinge pivotally attaches the primary frame to the secondary frame for angular movement about a pivot axis that is transverse to the longitudinal axis so that the secondary frame is movable between a lowered position and a raised position. The lowered position has the secondary frame adjacent to the primary frame and the raised position having the secondary frame raised at an acute angle at the hinge.

12 Claims, 26 Drawing Sheets

(51) Int. Cl.

| | |
|---|---|
| ***B60P 1/28*** | (2006.01) |
| ***F16B 7/14*** | (2006.01) |
| ***F16B 39/12*** | (2006.01) |
| ***F16B 39/34*** | (2006.01) |

(58) Field of Classification Search
USPC .......................................................... 298/17 R
See application file for complete search history.

(56) References Cited

U.S. PATENT DOCUMENTS

| | | | |
|---|---|---|---|
| 2008/0238180 A1 | 10/2008 | Kraenzle | |
| 2017/0057392 A1 | 3/2017 | Killgour et al. | |
| 2023/0406187 A1* | 12/2023 | Kendall | F16B 5/02 |

* cited by examiner

FRAME FOR A VEHICLE

FIELD

The invention relates to frame assemblies on which can be fitted onto a vehicle.

BACKGROUND

Utility vehicles (Utes), pick-up trucks, dumpers, lorries and small trucks are generally used to transport goods that cannot fit into conventional sized cars such as sedans and hatchbacks. To transport these goods, utes and the like have a load receiving body such as an open tray. The tray is used as a platform to receive and support goods when the vehicle is driven between locations.

Natural material such as soil is commonly moved between locations for landscaping or building construction activities. Utes and trucks are often used to transport soil. Soil may be introduced into the tray of a ute or a truck by a silo or dumping mean positioned above the tray. However, it is often difficult to remove goods such as soil from the tray of a vehicle.

Removing the soil from the tray of a vehicle usually requires a user to stand on a short ladder or to jump into the tray. The soil is then shoveled off manually. This practice is generally unsafe, time consuming and labour intensive.

Additionally, equipment such as bikes, trolleys, and wheeled items are difficult to place and remove from a vehicle tray without access to lifting equipment.

OBJECT OF THE INVENTION

It is an object of the present invention to substantially overcome or at least ameliorate one or more disadvantages of the prior art, or at least provide a useful alternative.

SUMMARY OF INVENTION

In a first aspect the present invention provides an assembly to be mounted on a vehicle to support a load receiving body on the vehicle, the vehicle having a forward direction of travel with the load receiving body being tiltable, the assembly including:

a primary frame, having a longitudinal axis, that is to be attached to the vehicle;

a secondary frame extending between the primary frame and to be attached to the load receiving body;

a hinge pivotally attaching the primary frame to the secondary frame for angular movement about a pivot axis that is transverse to the longitudinal axis so that the secondary frame is movable between a lowered position and a raised position, the lowered position having the secondary frame adjacent to the primary frame and the raised position having the secondary frame raised at an acute angle at the hinge;

a first actuator pivotally attached to a portion on the primary frame and pivotally attached to the secondary frame and operable to cause angular movement of the secondary frame about the pivot axis; and a second actuator attached to the portion and mounted to primary frame and operable to cause movement of the hinge portion in a direction generally parallel to the longitudinal axis.

Preferably, the longitudinal axis is generally parallel to the forward direction of travel.

Preferably, the longitudinal axis is generally transverse to the forward direction of travel.

Preferably, the primary frame further includes a slidable cross member in which the portion is attached.

Preferably, the slidable cross member travels parallel to the longitudinal axis.

Preferably, the primary frame and the secondary frame each comprise two or more elongate members and a plurality of cross members.

Preferably, the cross members are spaced from each other and are situated between the elongate members.

Preferably, the plurality of cross members and elongate members of the primary and secondary frame are connected by couplings.

In a second aspect the present invention provides an assembly to be mounted on a vehicle to support a load receiving body on the vehicle, the vehicle having a forward direction of travel with the load receiving body being tiltable, the assembly including:

a primary frame, having a longitudinal axis, that is to be attached to the vehicle;

a secondary frame extending between the primary frame and to be attached to the load receiving body;

a hinge pivotally attaching the primary frame to the secondary frame for angular movement about a pivot axis that is transverse to the longitudinal axis so that the secondary frame is movable between a lowered position and a raised position, the lowered position having the secondary frame adjacent to the primary frame and the raised position having the secondary frame raised at an acute angle at the hinge;

an actuator extending between the primary frame and the secondary frame for the angular movement of the secondary frame; and a first catch portion attached to the primary frame and a second catch portion attached to the secondary frame;

wherein the secondary frame is movable longitudinally to the primary frame by operation of the actuator between a locked position and a released position with the first and second catch portions engaged when in the locked position.

Preferably, the first catch portion includes a surface attached to the hinge and the second catch portion includes a projection located above the surface such that when the second frame is in the locked position the surface abuts the projection.

Preferably, the first catch portion is a plate attached to the assembly.

In a third aspect, the present invention provides fastener assembly including:

a shaft, the shaft having:

an end extremity;

an enlarged portion spaced from the end extremity;

a threaded length located adjacent the end extremity and located between the end extremity and the enlarged position; and a notch spaced from the enlarged portion so at least part of the threaded length is located between the notch and the end extremity;

a sleeve, the sleeve having a passage through which the shaft extends, the sleeve further including a tubular portion and a flange extending transverse from the tubular portion; and a nut threadable engaged to the threaded length so that the sleeve is located between the nut and the enlarged portion;

wherein rotation of the nut about the shaft on the threaded portion while simultaneously inhabiting rotation of the sleeve moves the enlarged portion longitudinally into the tubular portion to cause plastic deformation until sufficient stress is applied to the shaft such that the shaft fractures at the notch.

Preferably, the notch is at a junction of the threaded portion and a non-threaded portion of the shaft.

Preferably, the enlarged portion is completely enclosed by the tubular portion.

Preferably, the enlarged portion has a tapered portion to engage the sleeve during rotation of the nut.

In a fourth aspect the present invention provides a fastener assembly including:

- a bolt having a bolt head and a threaded portion:
- a sleeve, the sleeve having a passage through which the bolt extends, the sleeve further including a tubular portion and a flange extending transverse from the tubular portion; and
- a nut threadable engaged to the threaded length so that the sleeve is located between the nut and the bolt head;
- wherein rotation of the bolt while simultaneously inhabiting rotation of the nut and sleeve moves the nut longitudinally into the tubular portion to cause plastic deformation until sufficient stress is applied to the shaft such that the sleeve plastically deforms and encloses the nut.

Preferably, the nut has a tapered portion to engage the sleeve during rotation of the bolt.

In a fifth aspect the present invention provides an assembly to be mounted on a vehicle to support a load receiving body on the vehicle, the vehicle having a forward direction of travel with the load receiving body being tiltable, the assembly including:

- a primary frame, having a longitudinal axis, that is to be attached to the vehicle;
- a secondary frame extending between the primary frame and to be attached to the load receiving body;
- the primary frame and secondary frame being formed by a plurality of elongate members and cross members;
- couplings attaching the cross members to their respective longitudinal members;
- fasteners securing each coupling to its associated members;
- a hinge pivotally attaching the primary frame to the secondary frame for angular movement about a pivot axis that is transverse to the longitudinal axis so that the secondary frame is movable between a lowered position and a raised position, the lowered position having the secondary frame adjacent to the primary frame and the raised position having the secondary frame raised at an acute angle at the hinge; and
- an actuator that extends between the primary frame and the secondary frame to pivot the body between the lowered position and the raised position.

BRIEF DESCRIPTION OF DRAWINGS

Preferred embodiments of the present invention will not be described, by way of examples only, with reference to the accompanying drawings, in which.

DESCRIPTION OF EMBODIMENTS

Figures 1A, 1B:
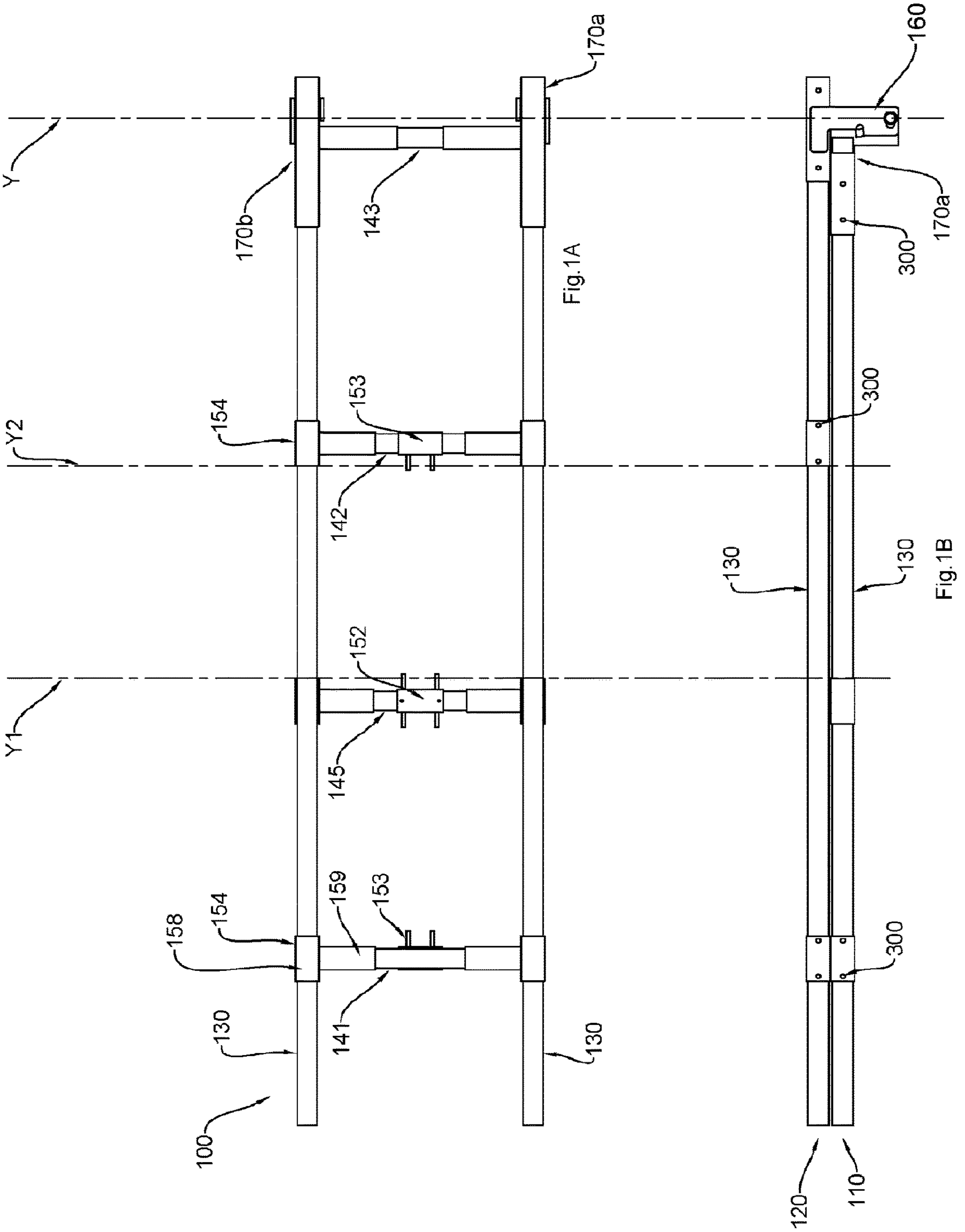
FIG. 1A is a top view of a frame for a vehicle in accordance with an embodiment of the invention.
FIG. 1B is a side view of the frame of FIG. 1A.

In the accompanying drawings there is illustrated an assembly 100 to be mounted on a vehicle. The assembly 100 is to support a load receiving body on the vehicle. The vehicle having a forward direction of travel defined by longitudinal direction X and the load receiving body being tiltable by the assembly 100 in the generally transverse direction Y relative to the longitudinal direction X. The assembly 100 includes a primary frame 110 to be attached to the vehicle. A secondary frame 120 extends between the primary frame 110 and the load receiving body.

The assembly 100 also includes a hinge assembly 170*a*, 170*b* comprising a two end couplings 232, pin 210 and hinge 160 for pivoting the secondary frame 120 about the transverse axis Y between a lowered position and a raised position. The hinge 160 is located at the rear of the primary frame 110 along the longitudinal direction X. The lowered position is defined when the secondary frame 120 is parallel and adjacent to the primary frame 110. The assembly 100 is in the raised position when the secondary frame 120 extends upwardly at an acute angle $\theta_1$, $\theta_2$ to the primary frame 110 from the longitudinal direction X.

A first actuator 161 extends and retracts between the primary frame 110 and the secondary frame 120 in the longitudinal direction X. The first actuator 161 provides enough force to pivot the secondary frame 120 to the raised position on the hinge. A second actuator 162 may also be utilised to further pivot the secondary frame 120. The second actuator 162 is configured to extend in the primary frame 110 along the longitudinal direction X.

As shown in FIG. 1A-1D, the primary frame 110 and the secondary frame 120 each comprise two generally parallel elongate members 130 spaced by a plurality of cross members 141, 142, 143, 144, 145, 146. The cross members 141, 142, 143, 144, 145, 146 are generally parallel with the other and transverse to elongate members 130 while being spaced at regular intervals. The primary frame 110 has first cross member 144, second cross member 145 and third cross member 146. The first and second cross members 144, 145 support the second actuator 162. The second cross member 145 is slidable along both elongate members 130 of the primary frame 110. This allows the second actuator 162 to extend or retract within the primary assembly 110. The first cross member 144 and third cross member 146 are fixed relative to each other by a fastening means 300, 301.

The secondary frame 120 includes three cross members 141, 142, 143 which are all fixed relative to each other. The first actuator 161 is hingedly mounted between the second cross member 145 of the primary frame 110 and the cross member 142 of the secondary frame 120.

The elongate members 130 and the cross members of both the primary and secondary frame 110, 120 are assembled together by couplings 154. Couplings 154 comprise first tubular portion 158 welded to second tubular portion 159. The first tubular portion 158 is a sleeve for receiving elongate member 130 throughout its length. The second tubular portion 159 telescopically extends transversely from the first tubular portion to telescopically receive end portions of cross members 141, 142, 143, 144. The couplings 154 may receive different shapes and sizes of elongate members 130 and cross members 141, 142, 143, 144. They may be tubular or solid and be of different cross sections such as square, rectangular or circular.

The elongate members 130 and cross members 141, 142, 144 may be fastened to the couplings 154 to secure the members, 142, 144 in place and stabilise the assembly 100. Actuator mounts 153 are located at cross members 142, 144 of the primary and secondary frames 110, 120 to support the first and/or second actuators 161, 162. Dual actuator mount 152 is located on the second cross member 145. Dual mount 152 accommodates both the first and second actuators 161 and 162.

Figures 1C, 1D:
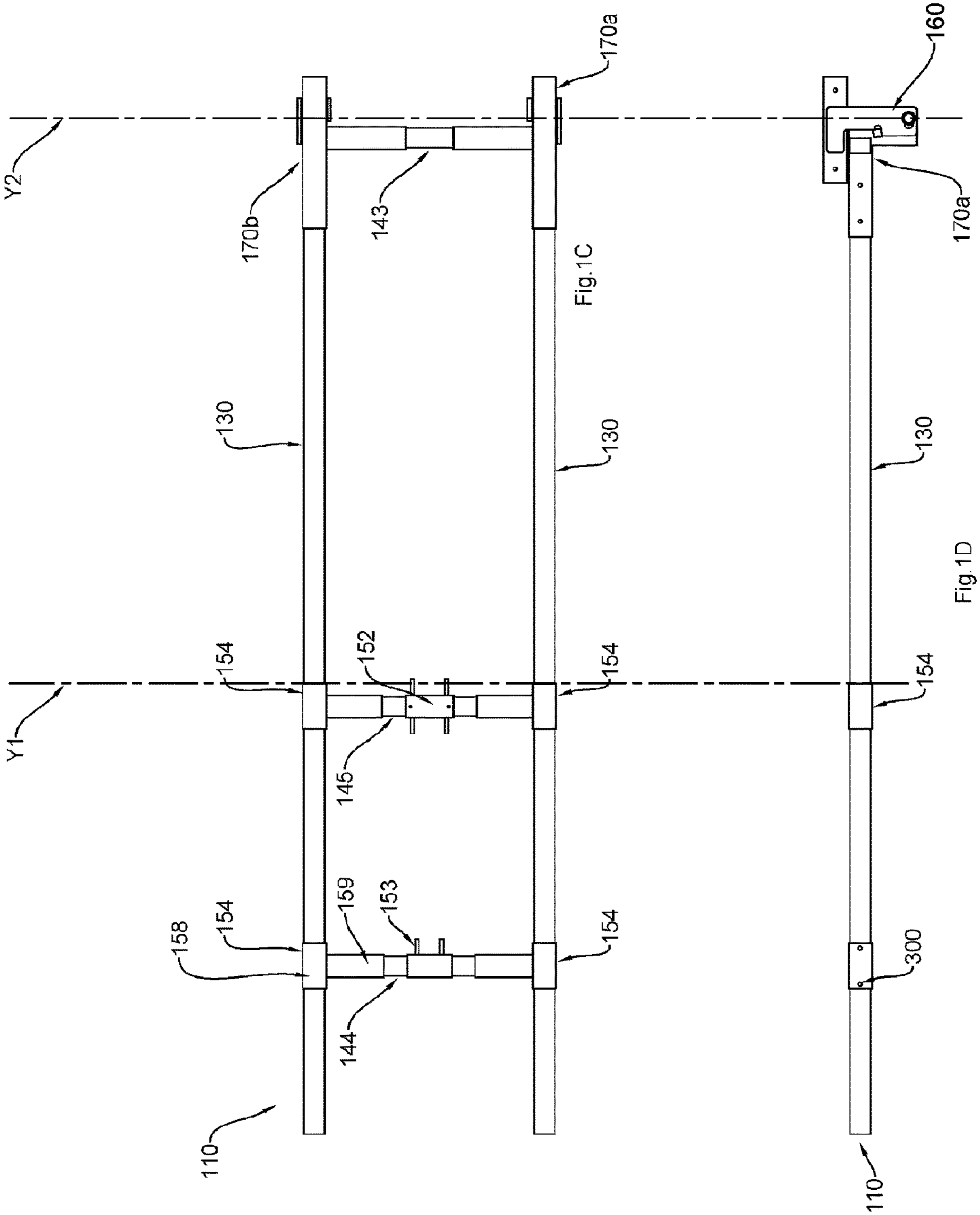
FIG. 1C is a top view of a primary frame of FIG. 1A.
FIG. 1D is a side view of the primary frame of FIG. 1C.

FIGS. 1C-1D show the primary frame 110 with the hinge assembly 170*a*, 170*b* without the secondary frame 120. The hinge assembly 170*a*, 170*b* end couplings 232 telescopically receive the elongate members 130.

Figure 2A:
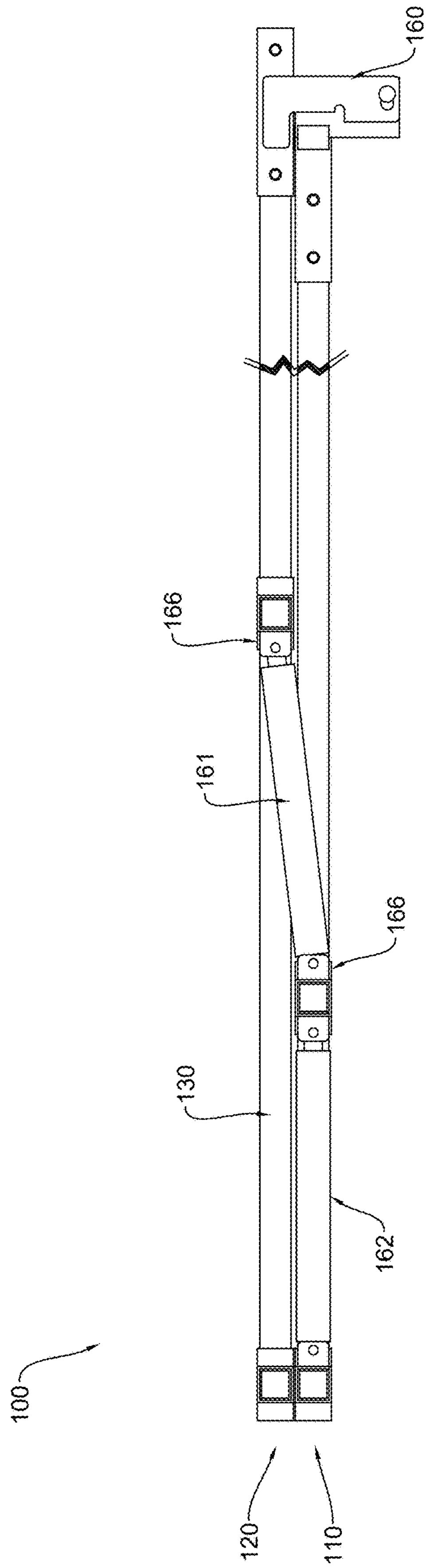
FIGS. 2A-2C show side section views of the frame of FIG. 1A.

FIG. 2A depicts a cross sectional view of the assembly 100. The first and second actuators 161, 162 are fully retracted. When the actuators 161, 162 are fully retracted the secondary frame 120 is considered to be in the lowered position.

Figure 2B:
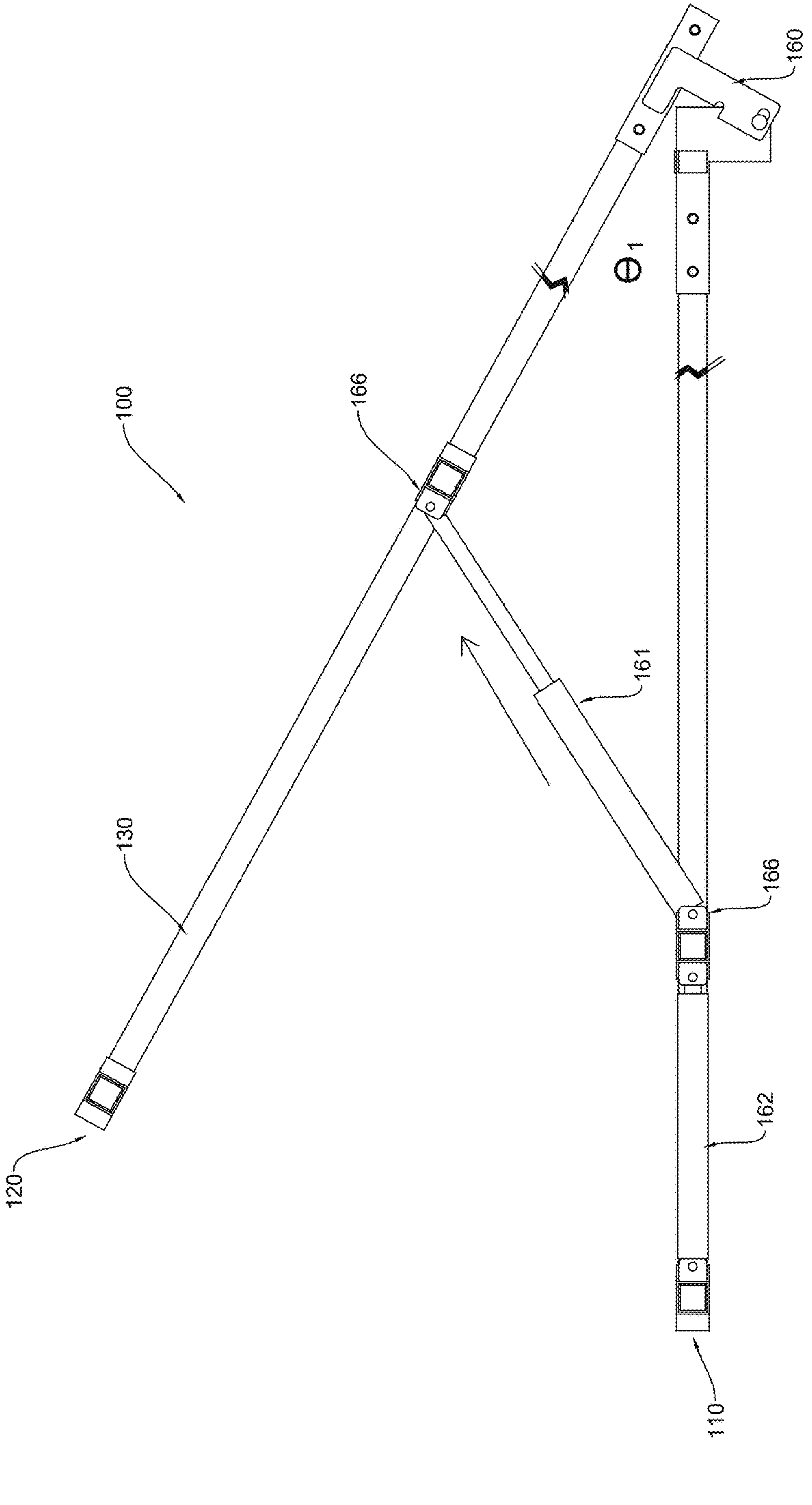

FIG. 2B depicts the same assembly shown in FIG. 2A however the secondary frame 120 is in the raised position. The secondary frame 120 is placed in the raised position by the extension of the first actuator 161. The first actuator 161 is free to pivot about axes Y1, Y2 as the first actuator 161 is hingedly mounted at both ends to the actuator mounts 153 and the dual actuator mount 152. The first actuator 161 being hingedly mounted allows the actuator to extend or retract so that the secondary frame 120 can pivot on the hinge 160. The secondary frame 120 may only pivot to an acute angle $\theta_1$, $\theta_2$.

Figure 2C:
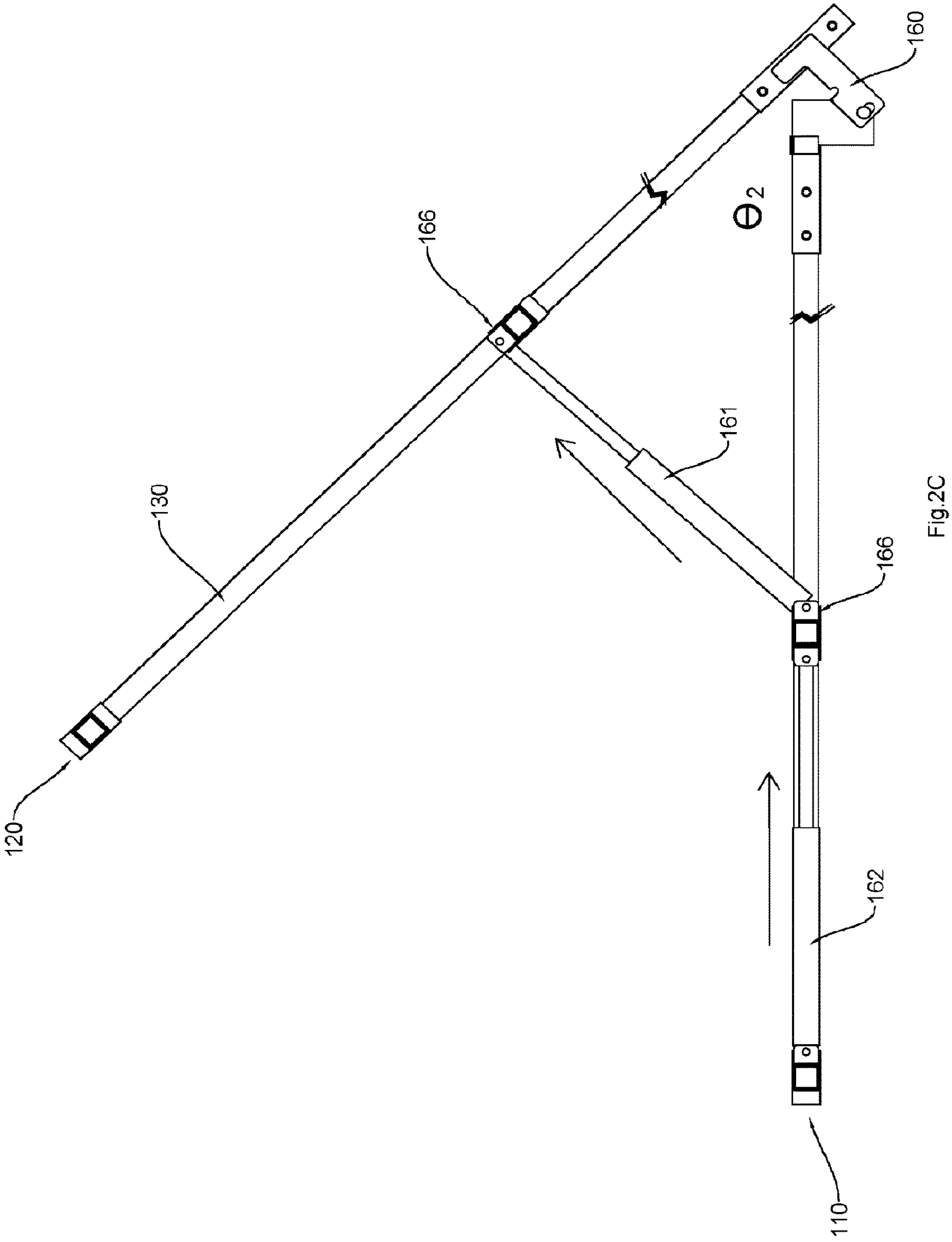

The secondary frame 120 may be raised to wider acute angles $\theta_1$, $\theta_2$ by the extension of second actuator 162. The second actuator 162 when extended as shown in FIG. 2C permits the secondary frame 120 to pivot at a greater angle $\theta_2$ compared to when only the first actuator 161 is extended. During extension of the second actuator 162 the second cross member 145 of the primary frame 110 slides along the longitudinal direction X and acts as a carriageway. Accordingly, this carriageway movement increases the angle between the primary and secondary frame 110, 120. The second actuator 162 is fixed rather than hingedly mounted to the actuator mounts 153 and the dual actuator mount 152.

Figure 3A:
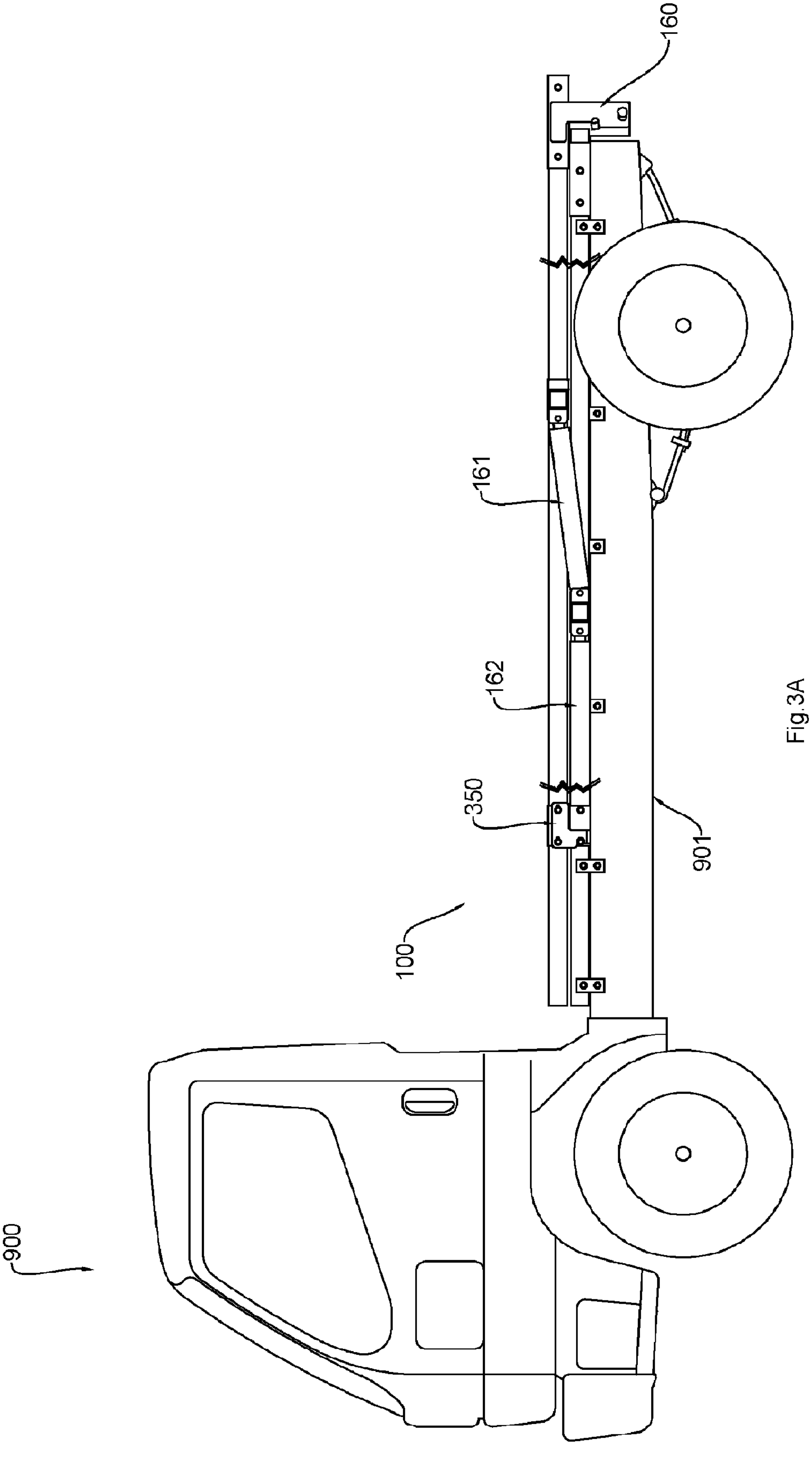
FIGS. 3A-3C show side section views of the frame of FIG. 2A on a truck.
Figure 3B:
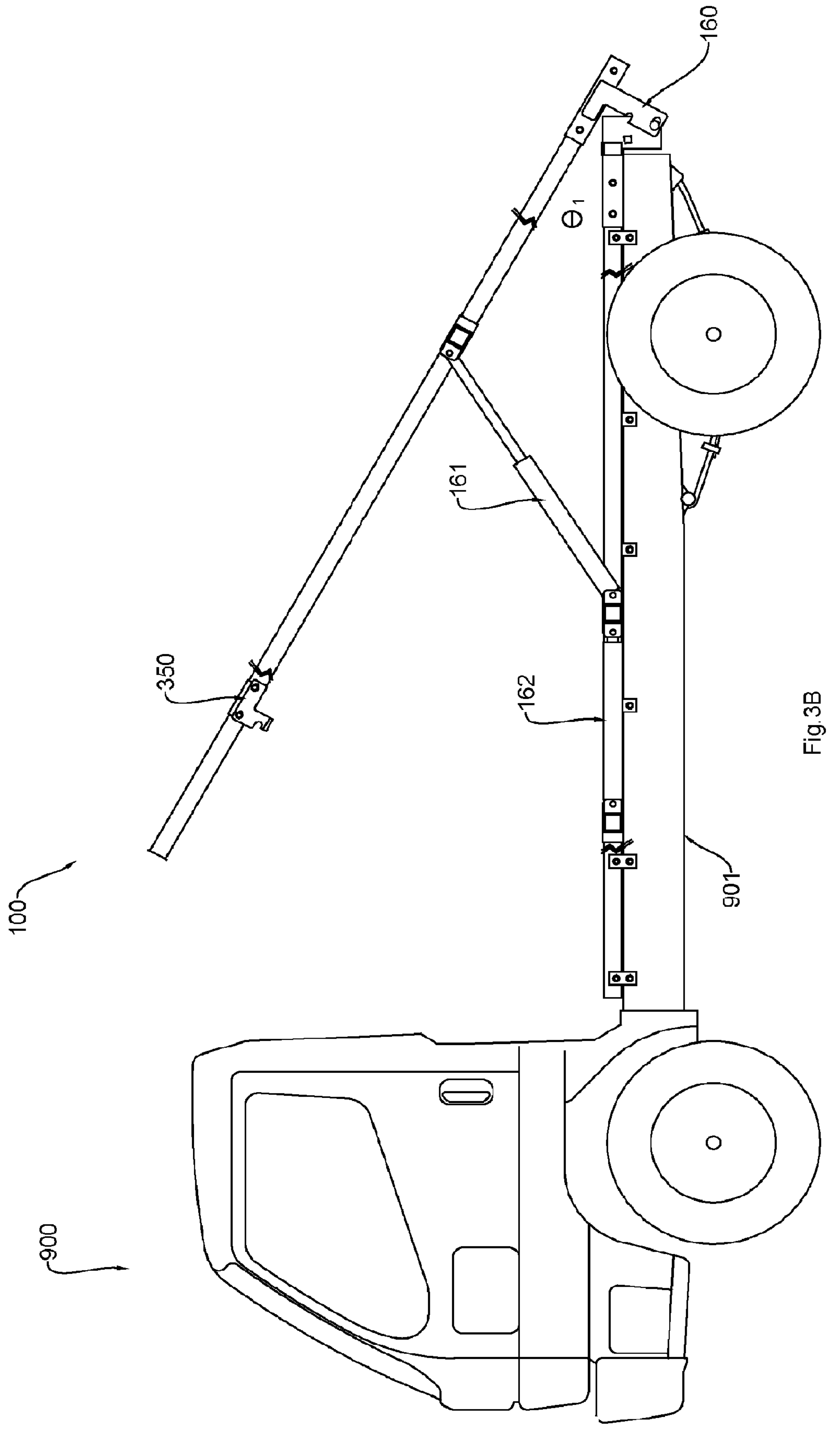
Figure 3C:
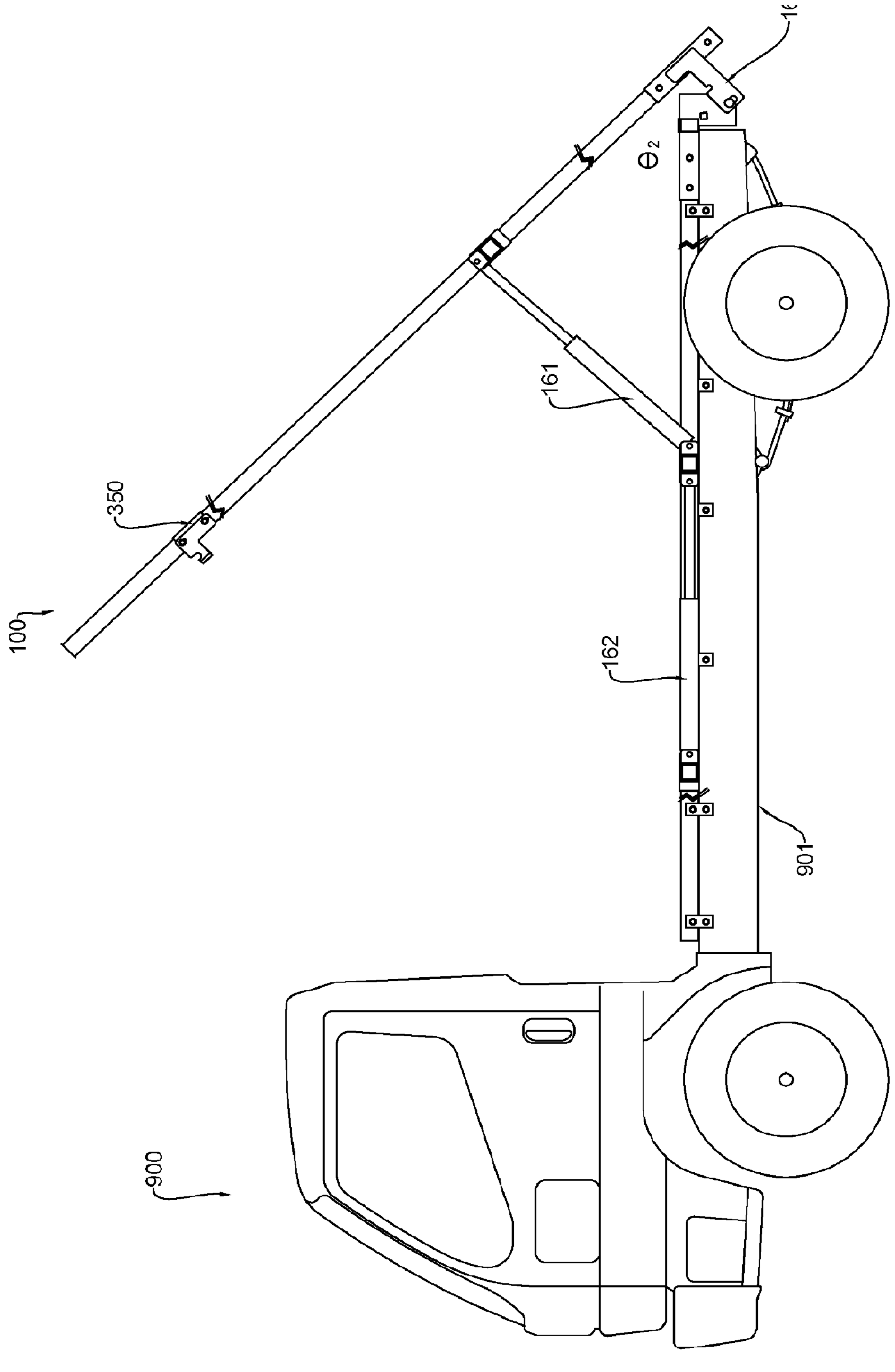

The assembly may be mounted to a truck 900 as shown in FIG. 3A-3C. The primary frame 110 is fixed to a chassis 901 of the truck 900. The frame can be pivoted to the raised or lowered position on the truck 900. In use, the truck 900 may be fitted with a body such as a tray. The tray would sit on the secondary frame 120 resulting in the tray being raised or lowered in unison with the secondary frame 120.

In use, a load receiving body is attached to the assembly at the secondary frame 120 for a load to be received on the load receiving body embodied as a tray. To assist placing the load on the tray, the secondary frame 120 may be pivoted to the raised position. Once the load is secured on the tray the secondary frame 120 is then pivoted to the lowered position. The load secured on the tray may be easily removed through moving the tray back into the raised position.

Advantageously, the described embodiment provides an easier way to remove loads such as soil or sand on a tray attached to the assembly 100. This is done by pivoting the secondary frame 120 into the raised position in which the soil or sand will slide off. Accordingly, a user is not required to use equipment such as a ladder or stepping device to access the tray. This eliminates the risk of falling from a ladder or stepping device as there is no need to use said equipment.

Throughout the description corresponding features in different embodiments have been given the same reference numerals.

Figure 4A:
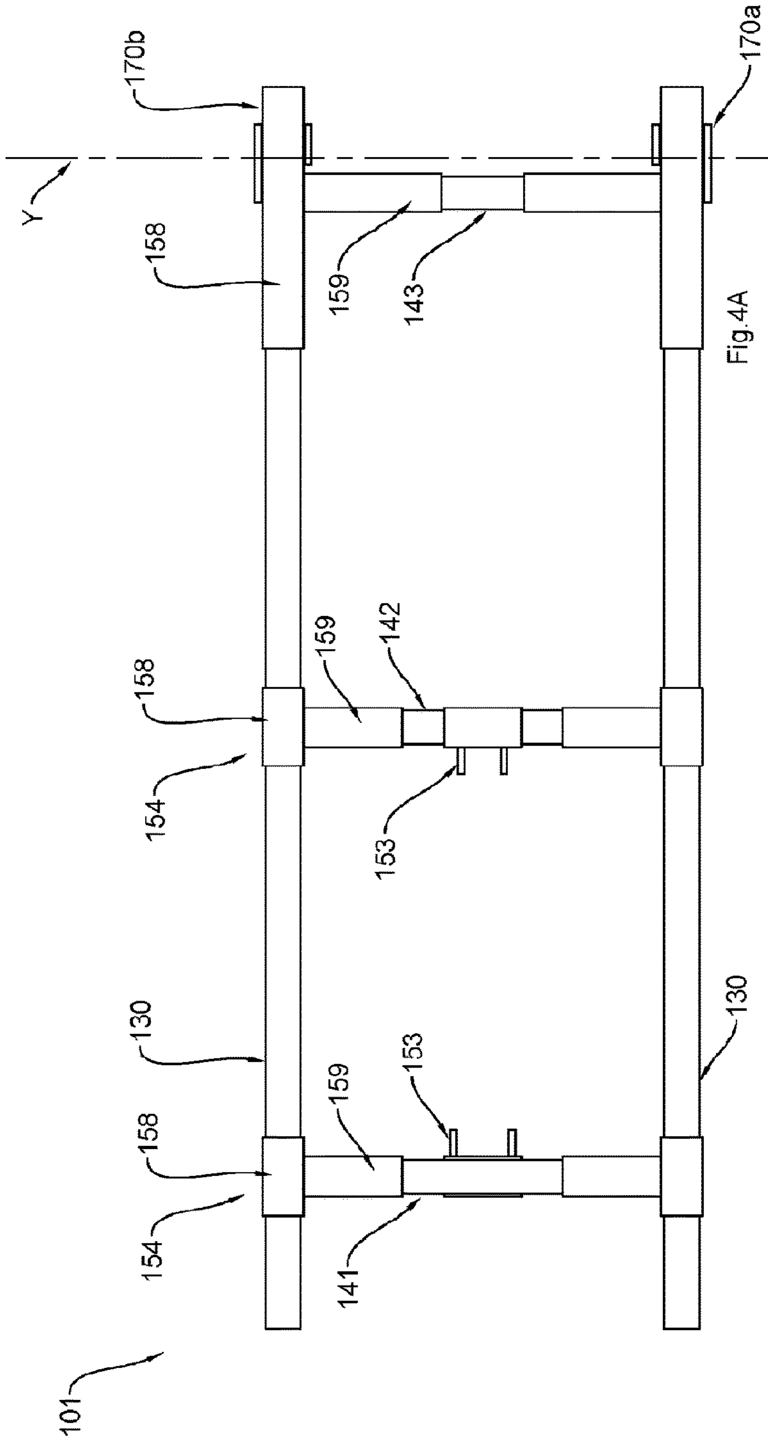
FIG. 4A is a top view of a frame for a vehicle in accordance with another embodiment of the invention.
Figure 4B:
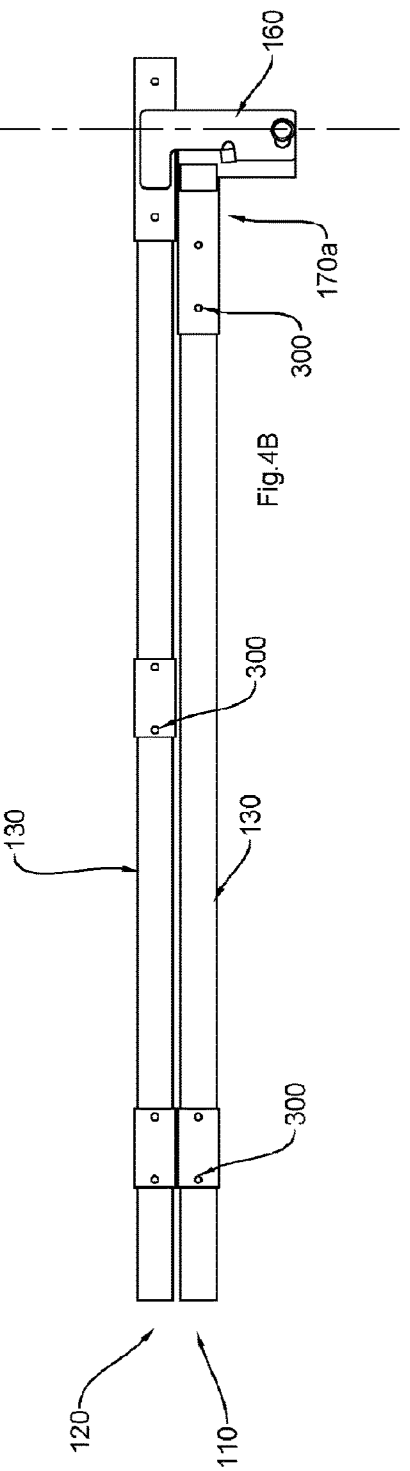
FIG. 4B is a side view of the frame of FIG. 4A.

FIGS. 4A-4B show another embodiment of the present invention. The assembly 101 includes a first actuator 161. The assembly 101 does not include a second actuator 162 as described in the earlier assembly 100. Consequently, the second cross member 145 is omitted in this assembly 101 as it is not needed. Assembly 101 is more suited for vehicles such as utes, pick-up trucks, small lorries and small trucks.

Figure 5A:
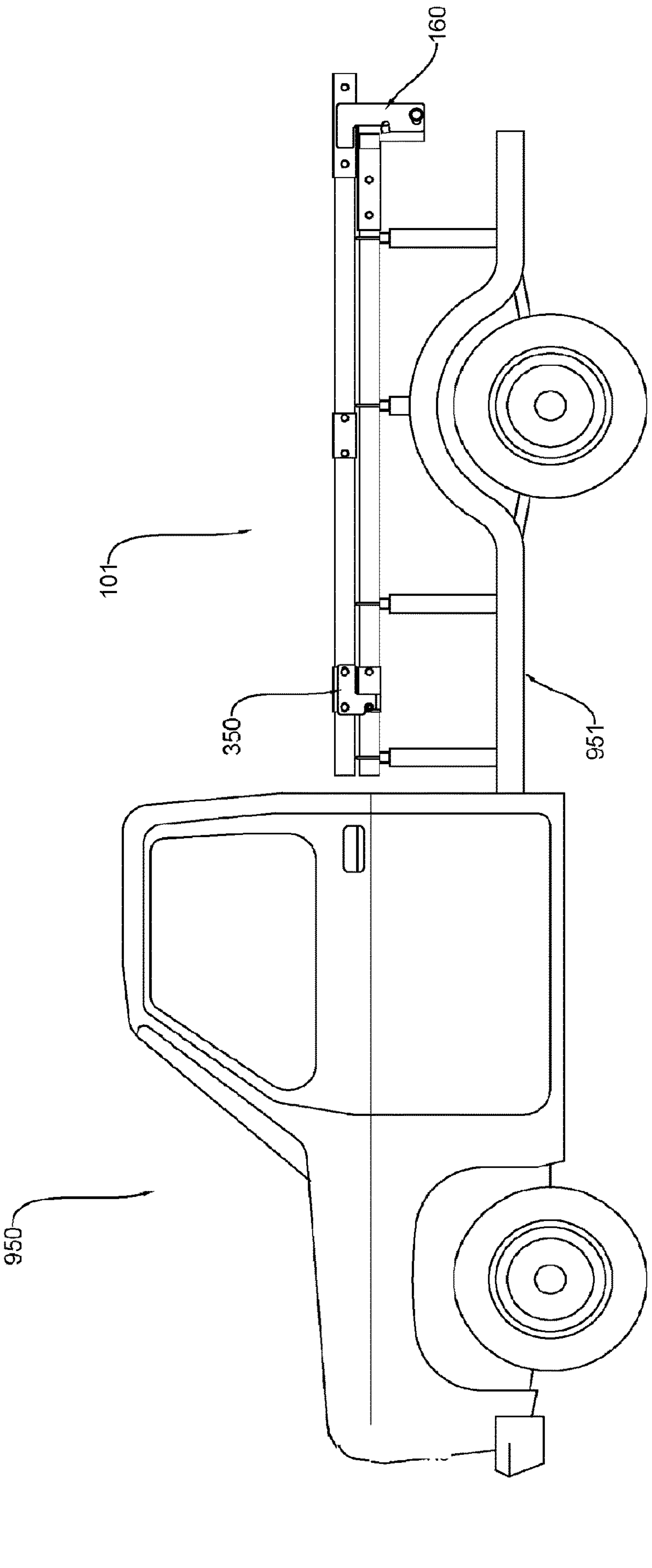
FIGS. 5A-5D show side section views of the frame of FIG. 4A on a utility vehicle.
Figure 5B:
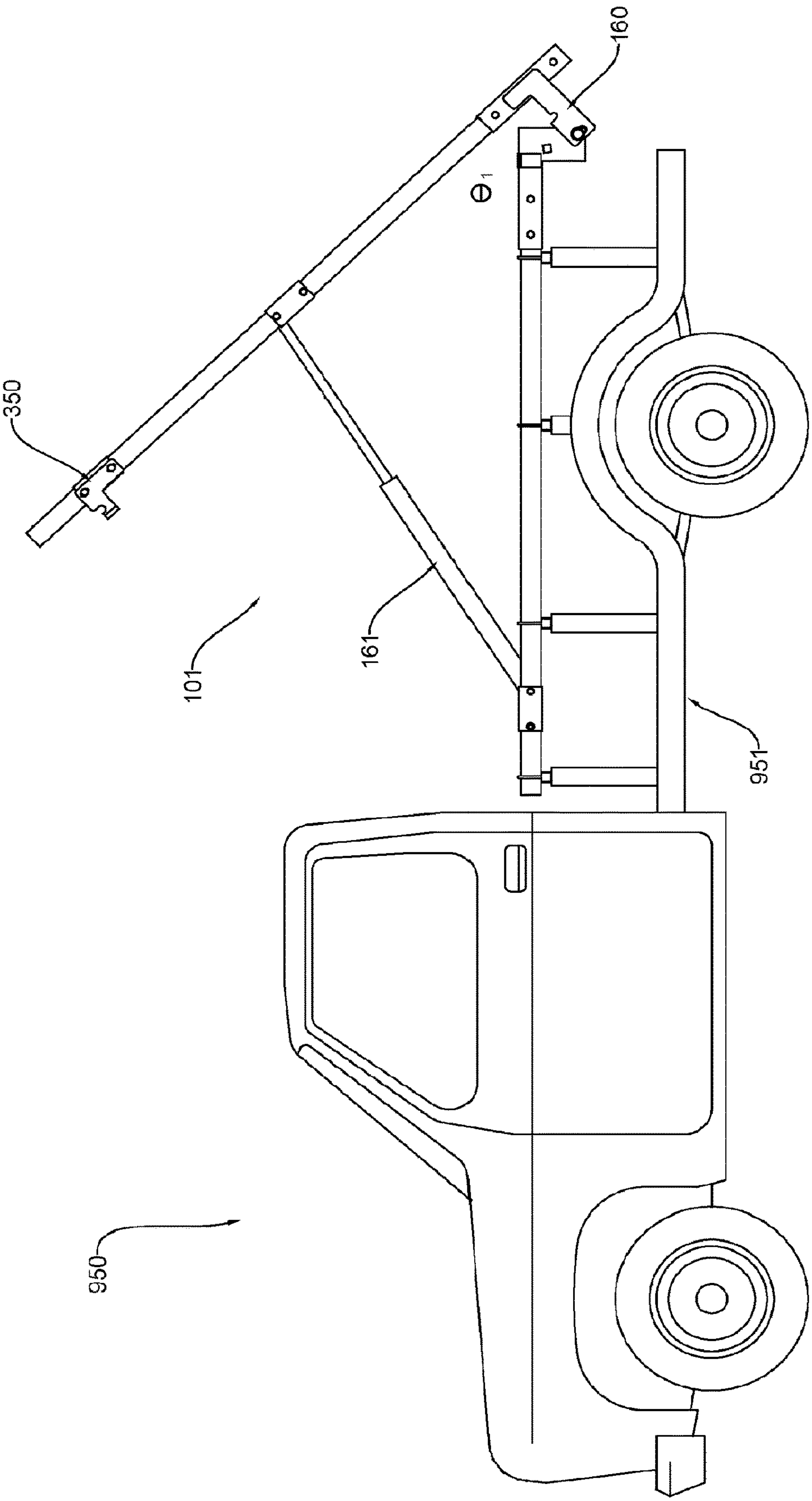

FIGS. 5A-5B show the assembly 101 mounted to the chassis 951 of a ute 950. As assembly 101 only has one actuator 161, the assembly 101 may be much shorter in length. Without the second actuator 162 the secondary frame 120 of assembly 101 is restricted in its maximum pivot angle in comparison to the secondary frame 120 of the assembly 100. This is because the second actuator 162 increases the pivot angle of frame 120. The maximum pivot angle of assembly 101 may be increased by extending the extension length of the first actuator 161.

Figure 5C:
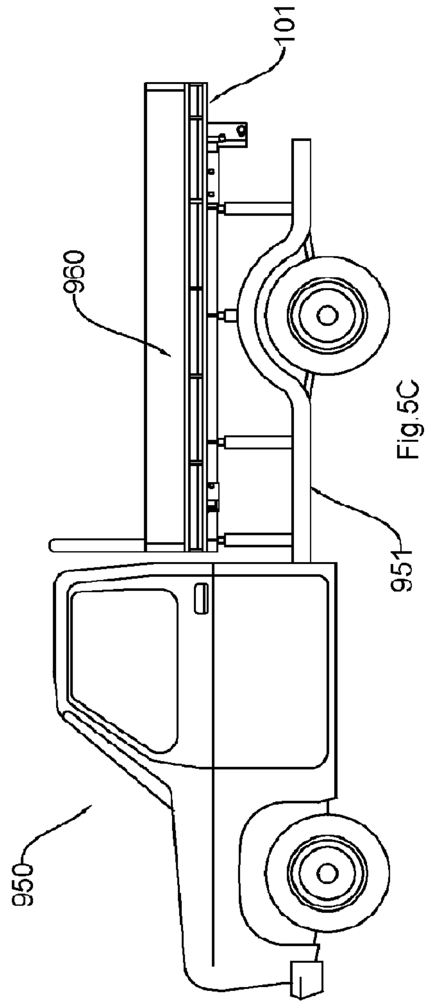
Figure 5D:
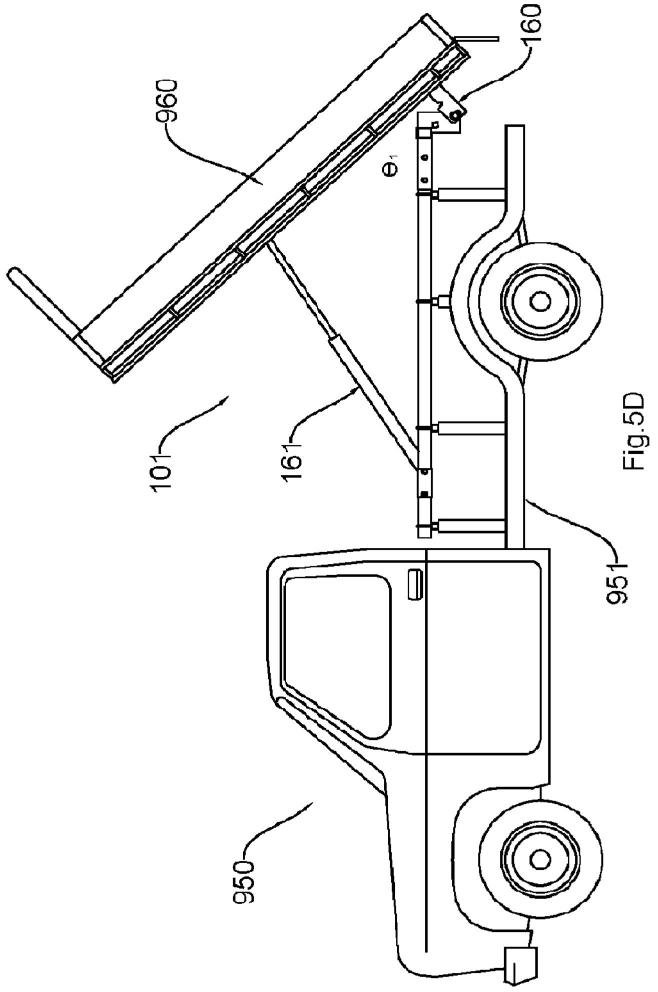

FIGS. 5C-5D show the ute 950 having the assembly 101 fitted with a load receiving body in the form of tray 960. The tray 960 is situated and fastened onto the secondary frame 120. Contents held in the tray 960 is tipped from the rear of the ute 950 when the secondary frame 120 is in the raised position.

Figures 6A, 6B:
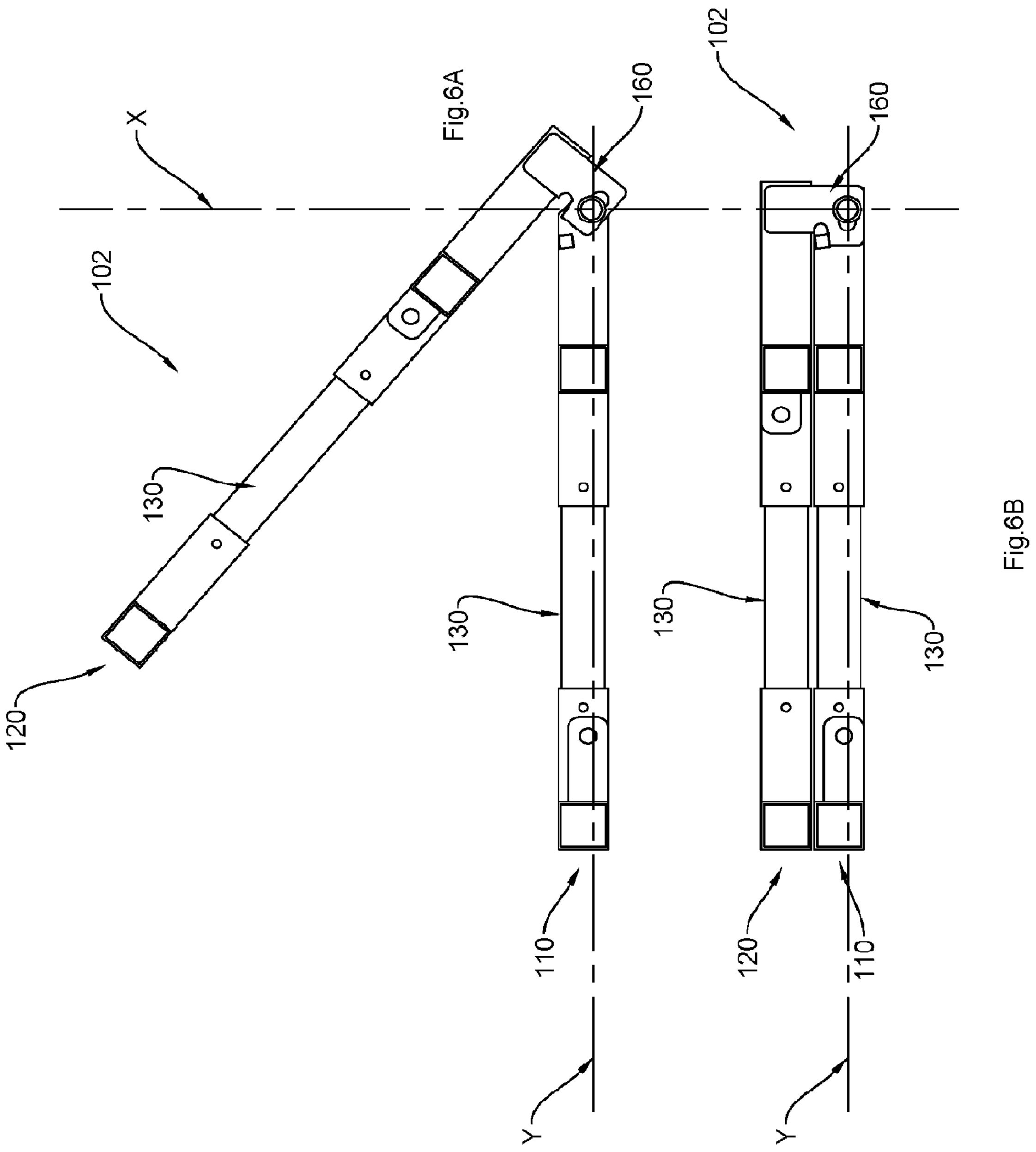
FIGS. 6A-6B show side views of a frame for a vehicle in accordance with another embodiment of the invention.

FIGS. 6A-6B show assembly 101 arranged in a side tipper assembly 102. The assembly 102 extends generally transverse to the forward direction of travel of the vehicle 990 in the direction Y. The secondary frame 120 of assembly 102 is pivotable about the hinge 160 in the longitudinal direction X.

Figure 7A:
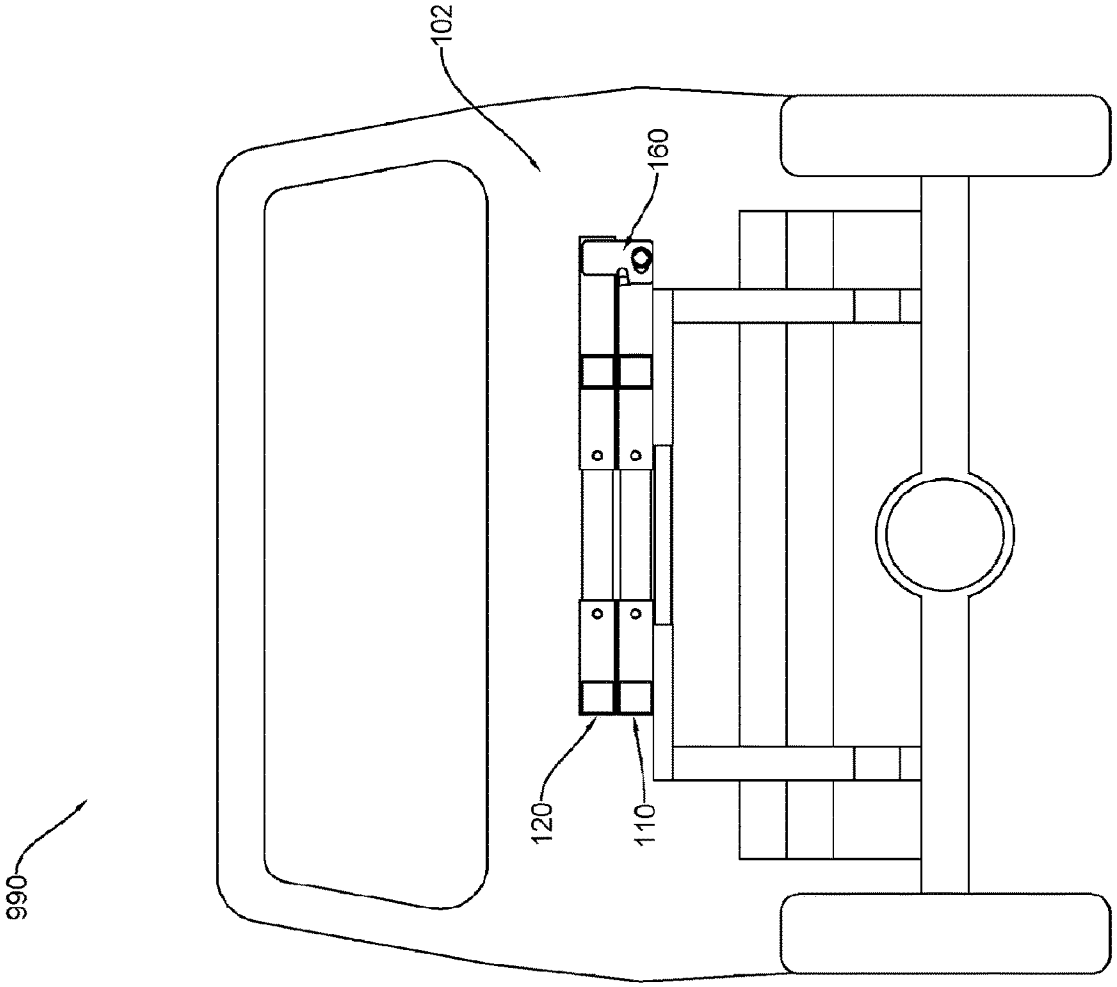
FIGS. 7A-7B show rear section views of the frame of FIG. 6A on a utility vehicle.
Figure 7B:
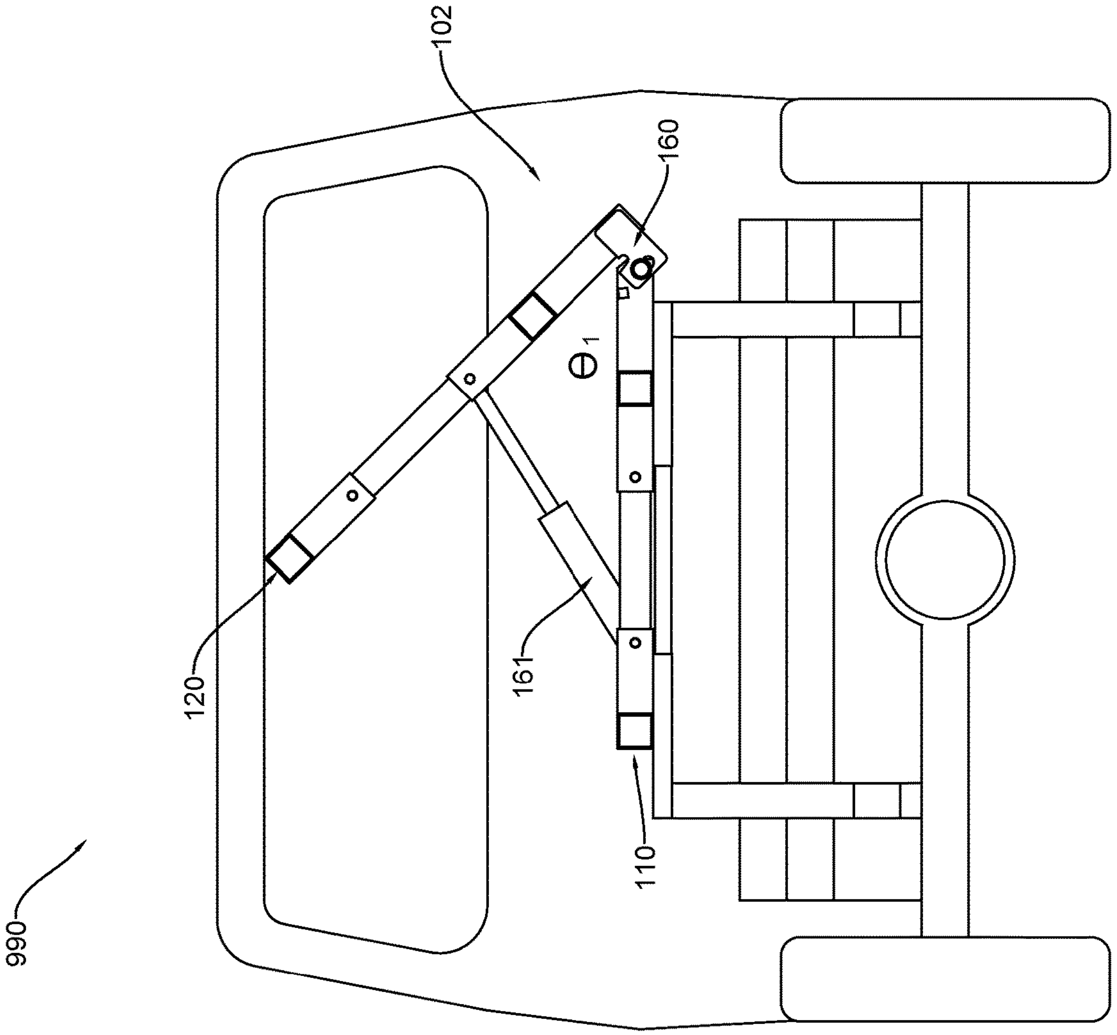

FIGS. 7A-7B shows assembly 102 arranged on a vehicle 990 for the assembly 102 to operate as a side tipper. The side tipper assembly 102 enables a user to more easily access sections of a load receiving body attached to the assembly 101 or spread a load to be tipped about the longitudinal direction X that is to the left or right of the vehicle 990.

Figure 8A:
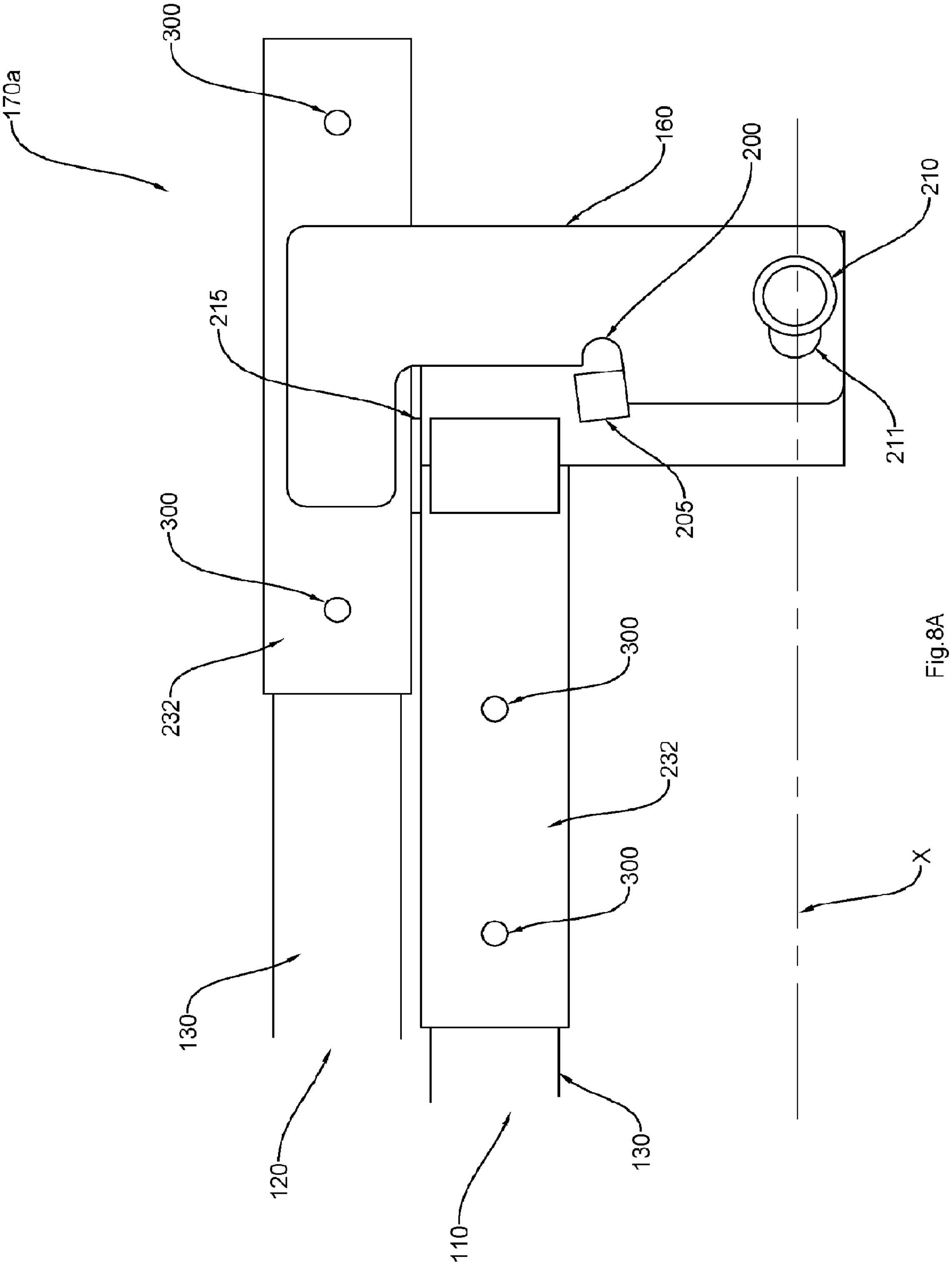
FIGS. 8A-8C show side views of a locking mechanism in accordance with an embodiment of the invention.
Figure 8B:
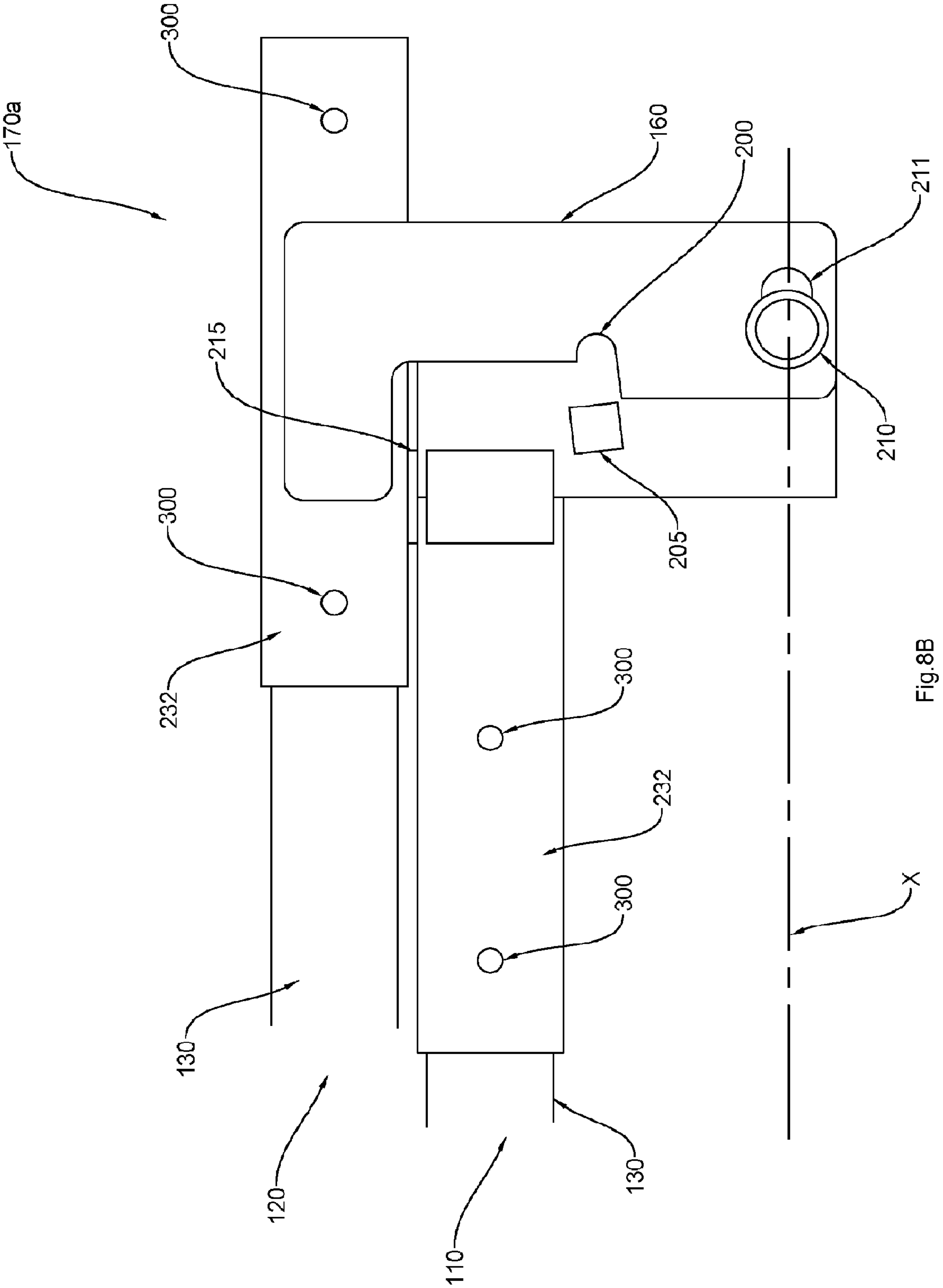
Figure 8C:
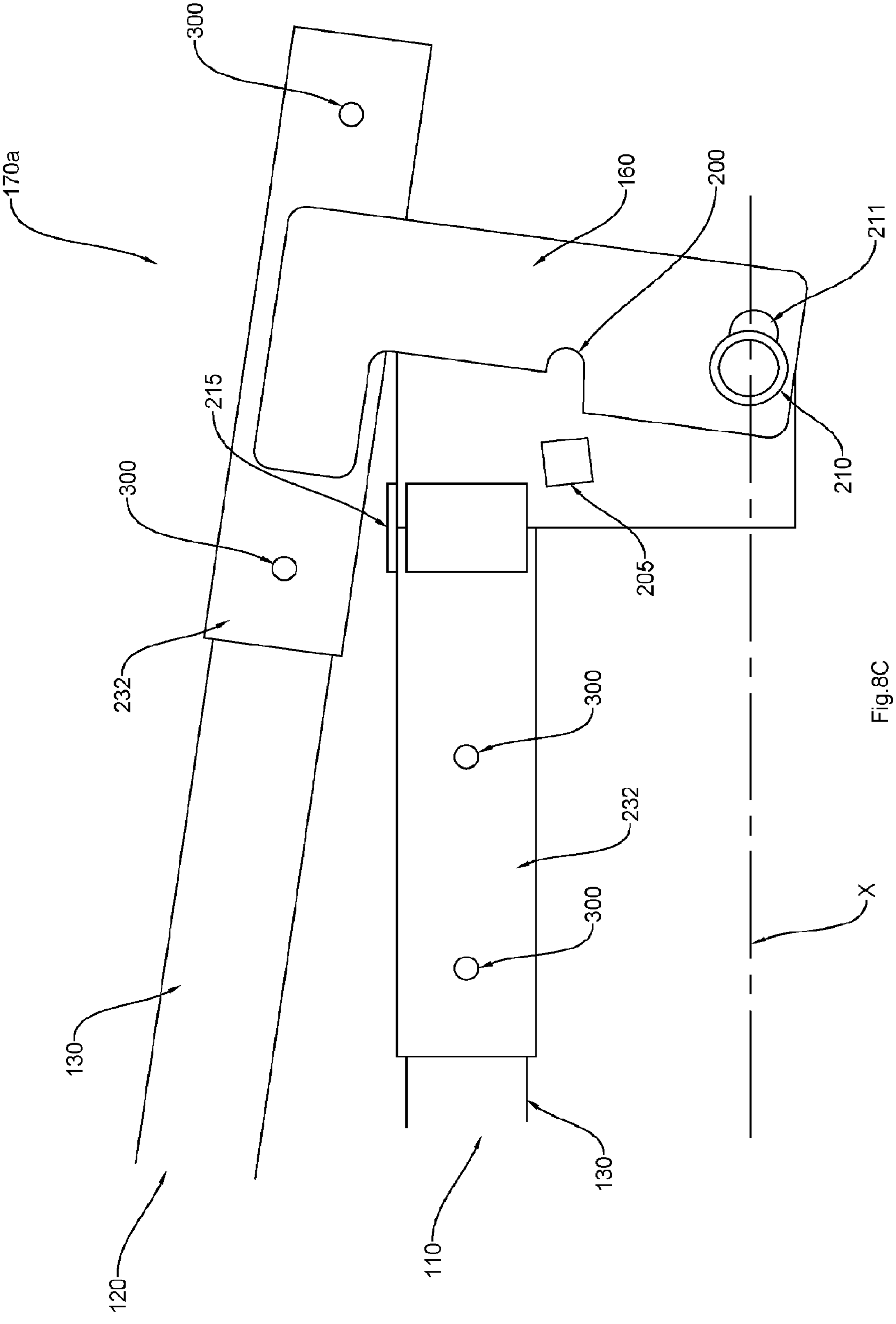

The invention further discloses a locking mechanism that can be used to lock the hinge of any one of the assemblies 100, 101, 102 described above to prevent pivoting of the secondary frame 120. FIGS. 8A-8C shows such mechanism. Hinge 160 comprises a catch formation 200 formed on the hinge 160. The catch formation 200 has at least one substantially flat surface. Catch member 205 protrudes out of hinge assembly 170*a*, 170*b*.

The catch member 205 engages with the flat surface of the catch formation 200 positioned below the catch member 205 when the secondary frame 120 is in the locked position, locking the frame 120 from pivoting at the hinge 160 as shown in FIG. 8A. The locked position is defined by the secondary frame 120 being in the lowered position and in the forward most position along the forward direction of travel. For the side-tipper arrangement the locked position is defined at the lowered position.

Moving the secondary frame 120 to the locked position once lowered is automated by the movement of one or more of the actuators 161, 162. Hinge 160 provides slot 211 to enable movement of the secondary frame in the longitudinal direction X. The second actuator 162 may retract the secondary frame 120 such that the frame 120 is placed in the locked position when in the lowered position. Alternatively, the secondary frame 120 may be placed in the locked position by the retraction of first actuator 161 for use in assemblies 101, 102.

The pin 210 is installed through the hinge 160 by passing through slot 211 and primary frame 110.

Figure 9A:
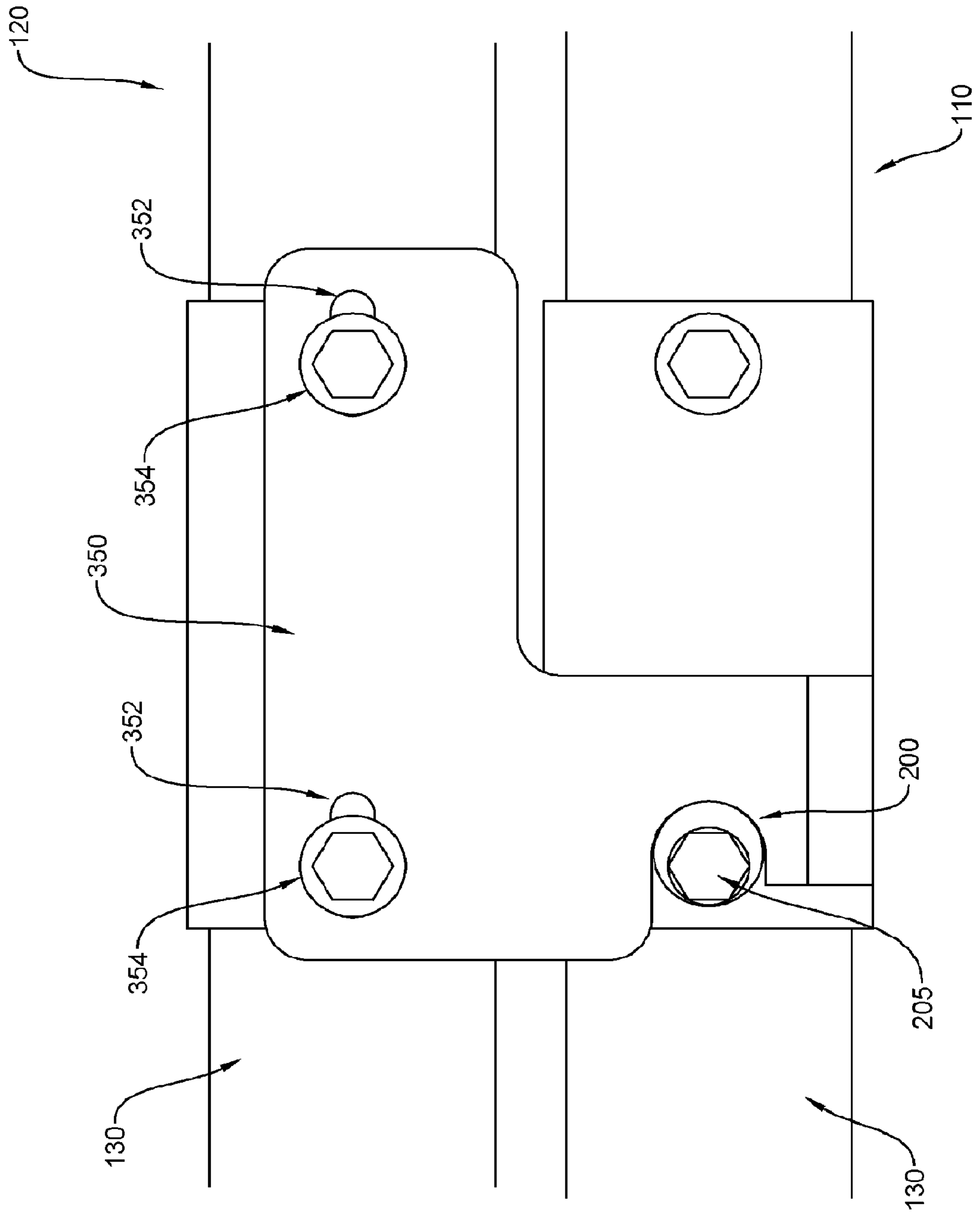
FIGS. 9A-9C show a side views of a second locking mechanism in accordance with another embodiment of the invention.
Figure 9B:
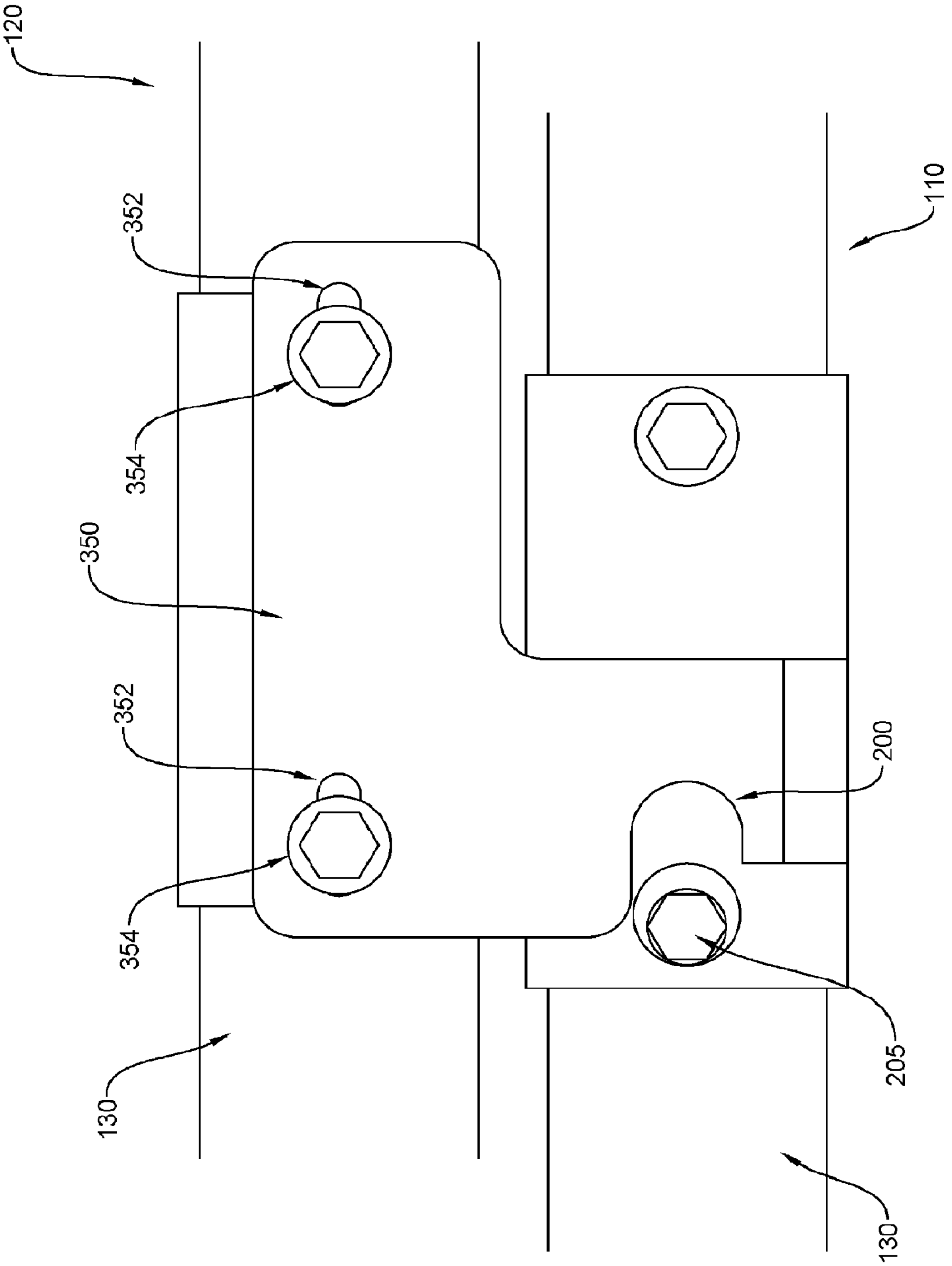
Figure 9C:
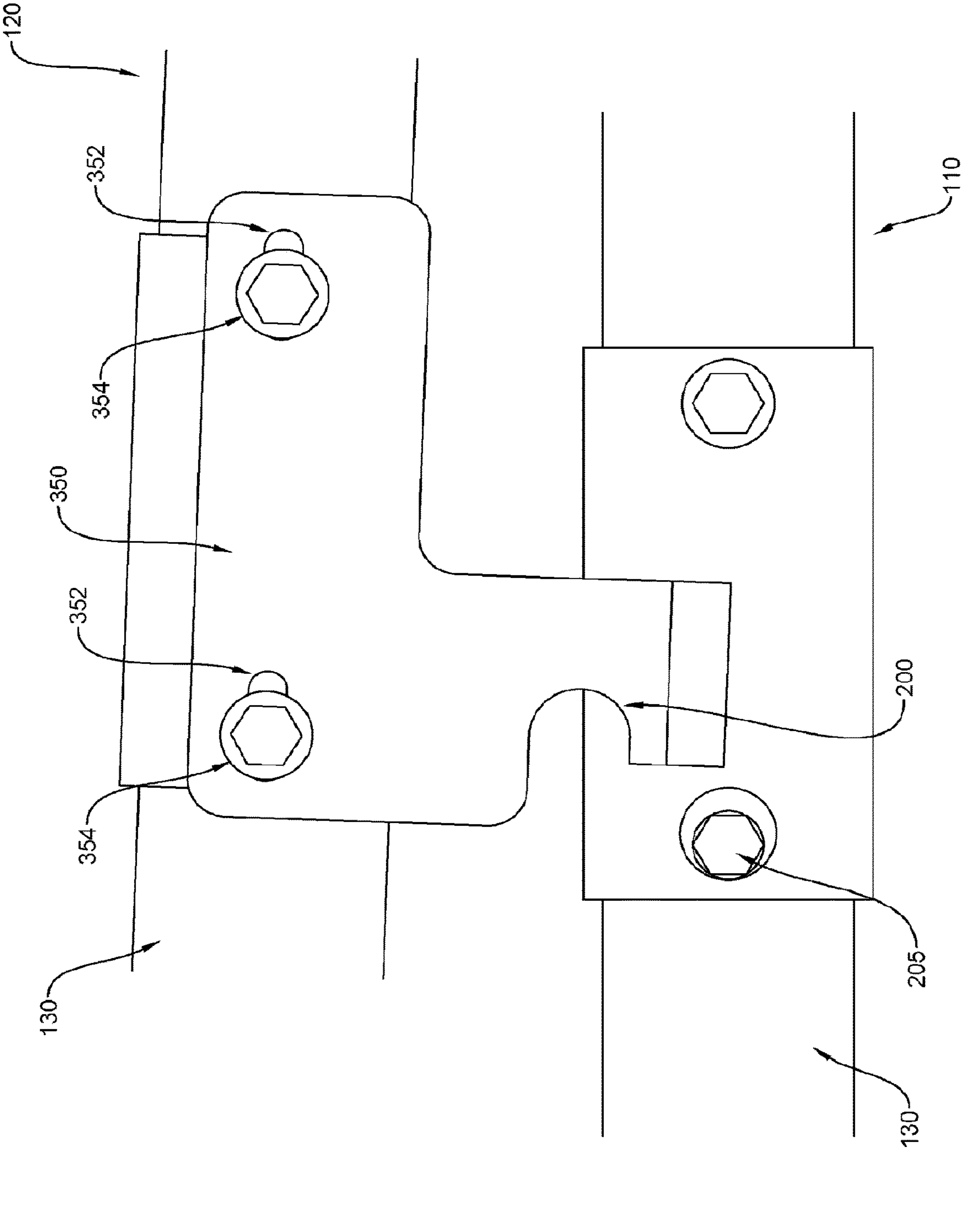

A catch plate 350 may also be provided between the primary and secondary frame 110, 120. As shown in FIGS. 9A-9C the catch plate 350 is mounted to the secondary frame 120 but may alternatively be mounted to the primary frame 110. The catch plate 350 is mounted with bolts 354. The catch plate 350 has a catch formation 200 in which receives a catch member 205.

The catch plate 350 as shown in FIG. 9A locks the secondary frame 120 from pivoting on the hinge 160. This is due to the catch member 205 in an interior surface of the catch formation 200 being positioned below the catch member 205 when pivoted. When the secondary frame 120 is moved in the longitudinal direction X away from the catch member 205 the catch formation 200 will be free of the catch member 205. This is shown in FIG. 9B. When the catch member 205 is not positioned in the catch formation 200 pivoting of the secondary frame 120 around the hinge 160 will not be restricted by this locking mechanism. FIG. 9C shows the positions of the catch member 205 and catch formation 200 when the secondary frame 120 is being raised or lowered.

The catch plate 350 and catch member 205 therefore provide another lock to prevent the secondary frame 120 from pivoting at the hinge 160. Both locking mechanisms may be used in unison or in isolation.

Figure 10:
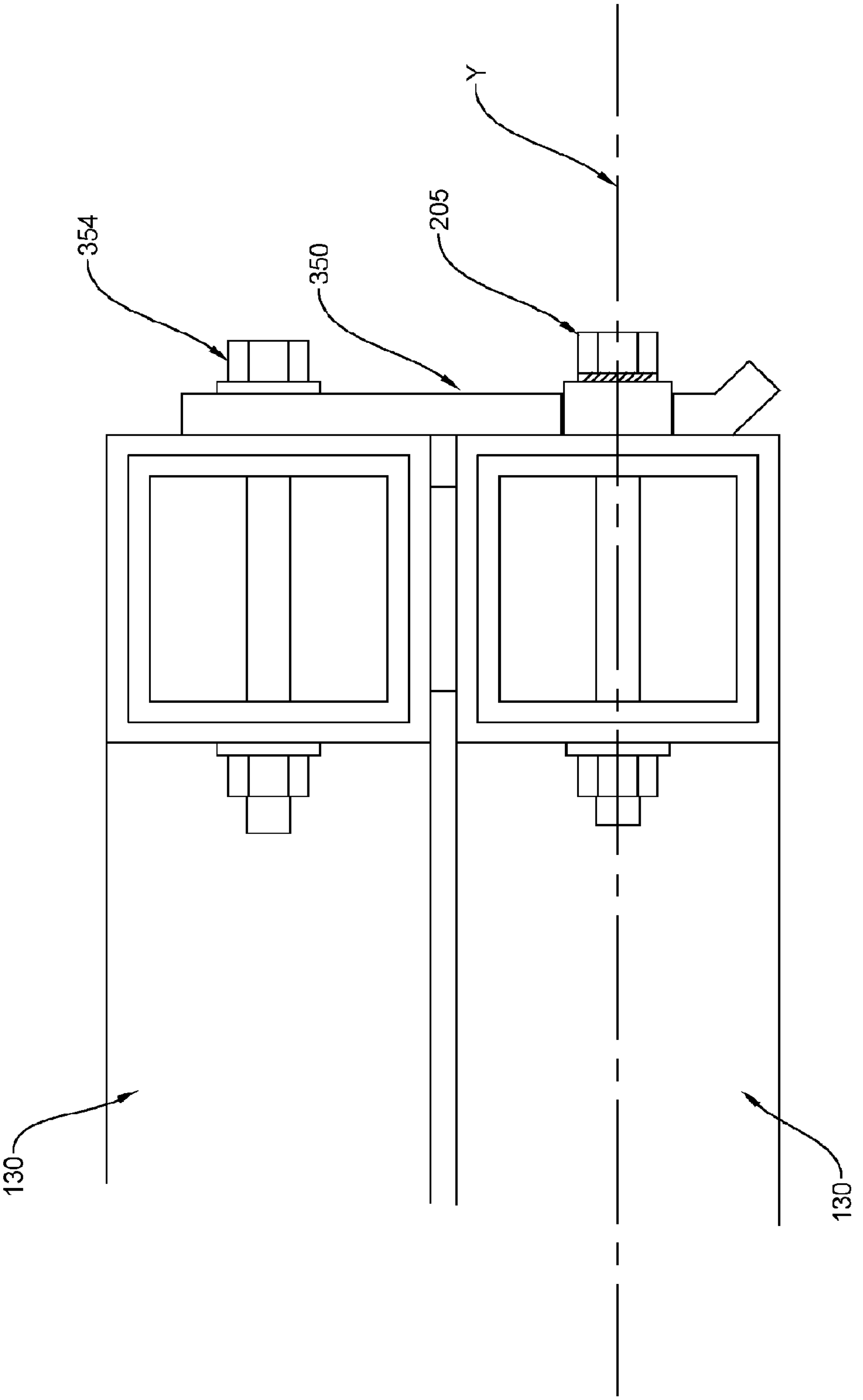
FIG. 10 is a front view of the second locking mechanism of FIGS. 9A-9C.

FIG. 10 shows a side view of the catch plate 350 and catch member 205. When the secondary frame 120 is in the locked position the catch member 205 is not free to rotate about transverse direction Y due to the impediment of catch member 205.

When using the assembly 100, 101, 102 the catch plate 350 can be removed from the assembly 100, 101, 102 if a secondary lock is not required.

FIGS. 11*a*-11*e* show an embodiment of a fastening means used to secure the elongate members 130 and the plurality of cross members 141, 142, 143, 144, 145, 146 to couplings 154, 170*a*, 170*b*.

The fastening means 300 includes a shaft 312. The shaft 312 has an end extremity 309 and an enlarged portion 308 spaced away from the end extremity 309. The enlarged portion 308 may have a tapered portion 330. The shaft 312 also has a threaded length 306 located adjacent the end extremity 309, but spaced from the enlarged portion 308. Furthermore, the shaft 312 includes an annular notch 307. The notch 307 is spaced from the enlarged portion 308 so at least a part of the threaded length 306 is located between the notch 307 and the end extremity 309.

The fastening means 300 also provides a sleeve 303 and a first nut 302. The sleeve 303 has a through passage X in which the shaft 312 can extend. The sleeve 303 includes a tubular portion 304 and a flange portion 305. The tubular portion 304 may have a leading internal chamfer on the end away from the flange portion. The flange portion 305 extends transversely from the tubular portion 304. The first nut 302 is threadably engagable to the threaded length 306.

Figures 11A, 11B, 11C, 11D, 11E:
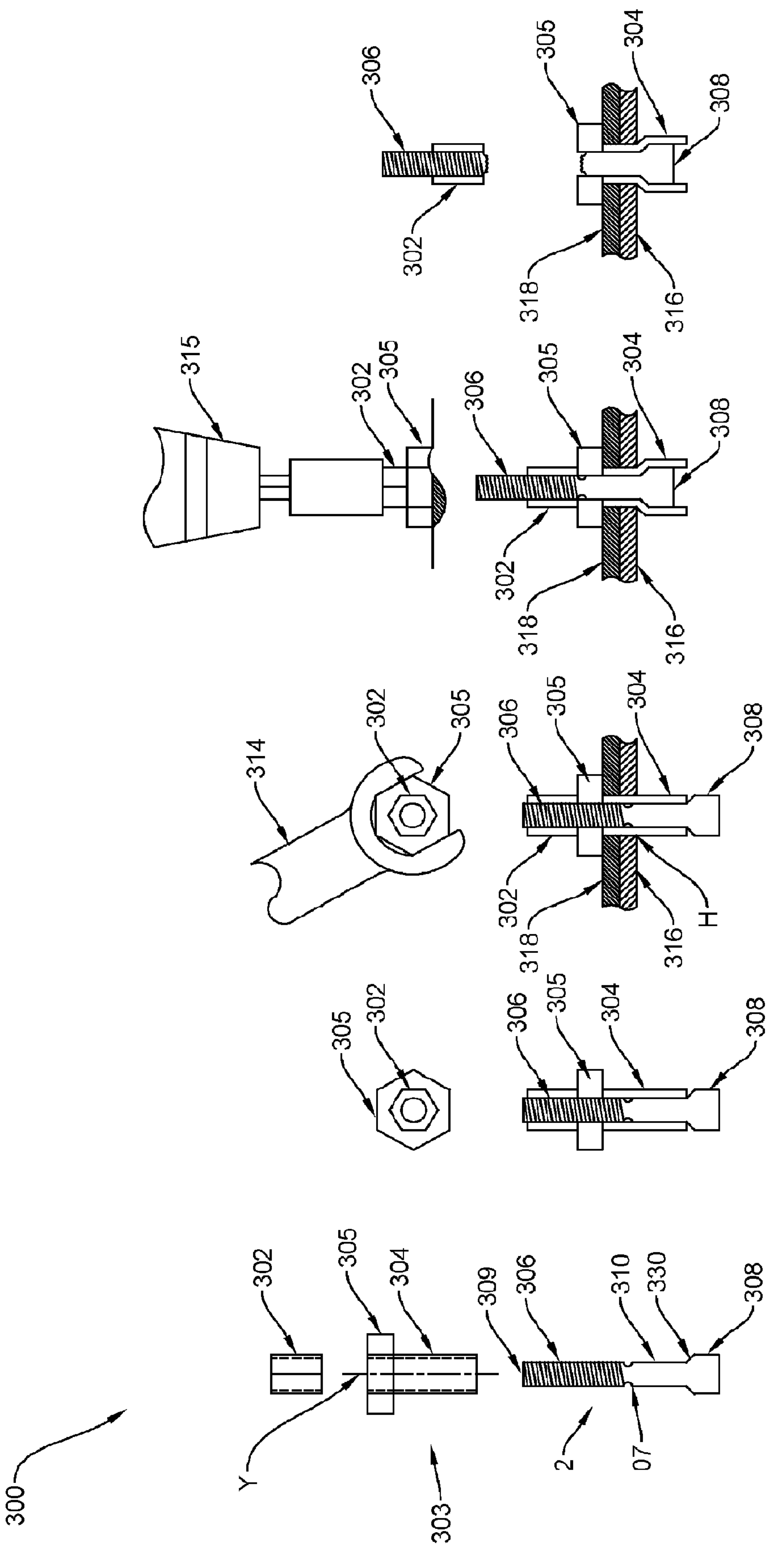
FIGS. 11A-11E show a fastening means in accordance with an embodiment of the invention.

In use, the shaft 312 is introduced to the sleeve 303 as shown in FIG. 11B. A through hole H through a first body 318 and a second body 316 is created. The through hole H may be created by drilling through the bodies 316, 318. The shaft 312 and sleeve 303 is then moved into the through hole in bodies 316, 318 by the enlarged portion 308 until the flange portion 305 abuts a surface of the first or second body 316, 318. No portion of the enlarged portion 308 may sit in the through holes.

The first nut 302 is then threadably received on the threaded length 306 of the shaft 312 until it abuts flange portion 305. The sleeve 303 is then held from rotation by such means as a spanner 314 engaging the flange portion 305. Inhibiting rotation of the sleeve 303 and rotating the first nut 302 on the threaded portion 306 causes the enlarged portion 308 to move longitudinally into the tubular portion 304 of the sleeve 303 as the sleeve 303 plastically deforms to accommodate the enlarged portion 308. Once sufficient stress is applied to the shaft 312 through rotation of the first nut 302, the shaft 312 fractures at the notch 307 as shown in FIG. 11E.

The bodies 316, 318 are held in mechanical securement by the upward pressure of the enlarged portion 308 of the shaft 312 and the reaction pressure the flange portion 305 exerts on the bodies 316, 318. The fastening means 300 therefore provides a strong mechanical bond between the two bodies 316, 318 that may be used in a variety of applications.

The disclosure further provides a fastening means 301. The fastening means comprises a bolt 313 with a bolt head 317, a sleeve 303 with a flange 305 and tubular portion 304, and tapered nut 390 with a tapered portion 330 as shown in FIGS. 12A-12D.

In use, the bolt 313 is first introduced and held in the sleeve 303. The tapered nut 390 is then threadably received onto the bolt 313 until the tapered portion 330 of the tapered nut 390 abuts the tubular portion 304 of the sleeve 303. The sleeve 303 is therefore secured between the bolt head 317 and tapered nut 390.

Figures 12A, 12B, 12C, 12D:
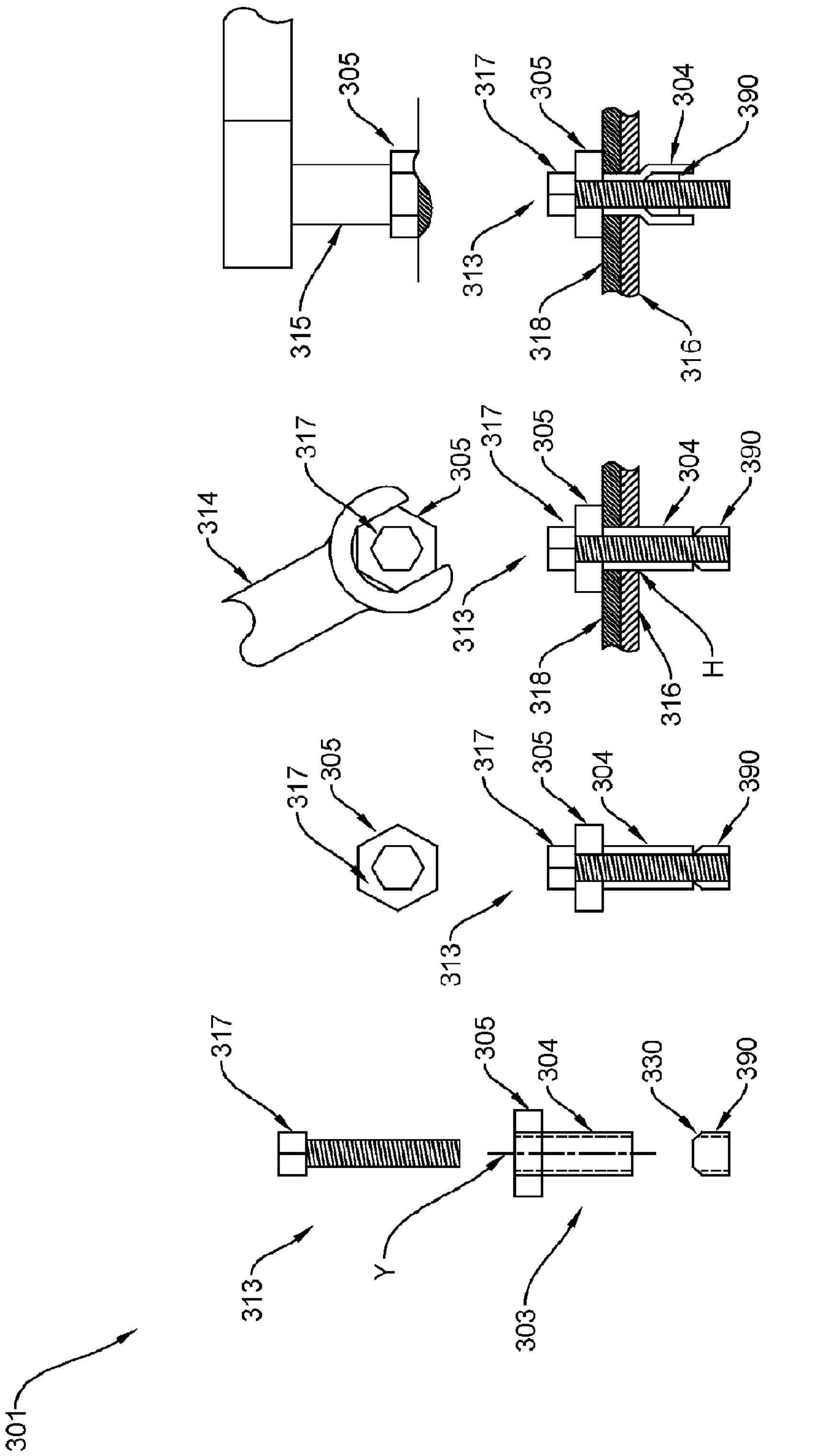
FIGS. 12A-12D show a fastening means in accordance with a second embodiment of the invention.

The tapered nut 390 and tubular portion 304 is then moved through a through hole H in a first body 318 and a second body 316 to fasten these two bodies 316, 318 together. The tapered nut 390 must completely pas through the through holes H as shown in FIG. 12C.

The sleeve 303 is then prevented from rotation by means such as a spanner 314 engaging the flange 305. The bolt 313 is then driven in a direction in which the tapered nut 390 will longitudinal move into the tubular portion 304 to cause plastic deformation of the sleeve 303. The tapered nut 390 is therefore frictionally engaged between the tubular portion 304.

The bodies 316, 318 are held in mechanical securement by the upward pressure of the tapered nut 390 and the reaction pressure of the bolt head 317 on the bodies 316, 318. The tapered portion 330 assists the movement of the tapered nut 390 into the tubular portion 304. The fastening means 301 is similar to the fastening means 300 in that they both provide a strong mechanical bond between bodies. The fastening means 300, 301 may be used in a variety of applications.

Figure 13:
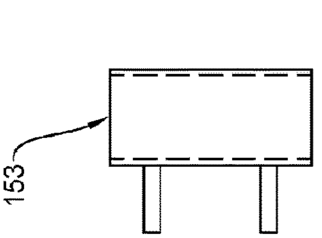
FIG. 13 is a top view of an actuator mount used in an assembly.
Figure 14:
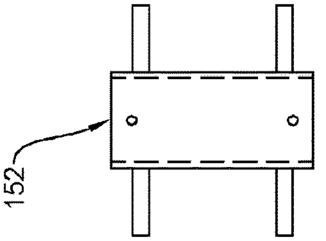
FIG. 14 is a top view of a dual actuator mount used in an assembly.

FIG. 13 is an enlarged view of the actuator mount 153 used in cross members 142, 144 while FIG. 14 is an enlarged view of the dual actuator mount 152 used on the second cross member 145. Actuator mount 153 can only accommodate one actuator. Dual actuator 152 can accommodate up to two actuators on either of its sides.

Figure 15:
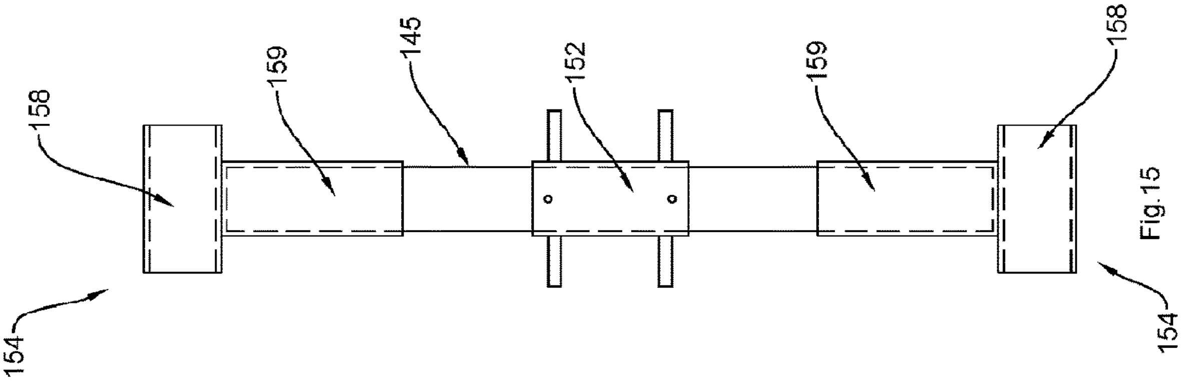
FIG. 15 is a top view of a cross member used in an assembly.

FIG. 15 provides an enlarged view of the couplings 154, the dual actuator mount 152 and the second cross member 145. Tubular portions 158 may be collars rather than tubular members in which elongate members 130 may be received. When elongate members 130 are received in the collar, the collar and elongate members 130 may be fastened to stop movement of the members 130 in the collar.

Figure 16B:
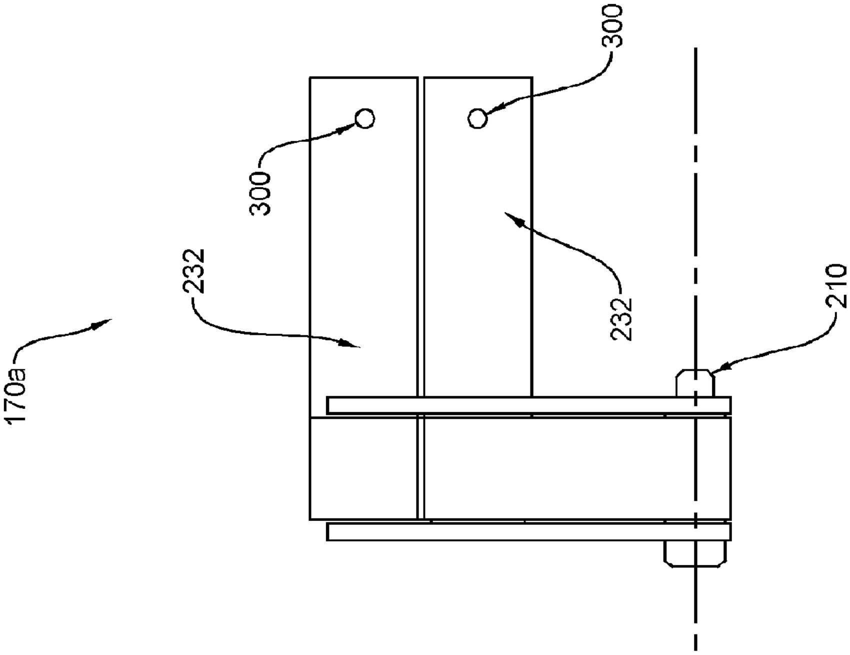
FIG. 16B is a rear view of FIG. 16A.
Figure 16A:
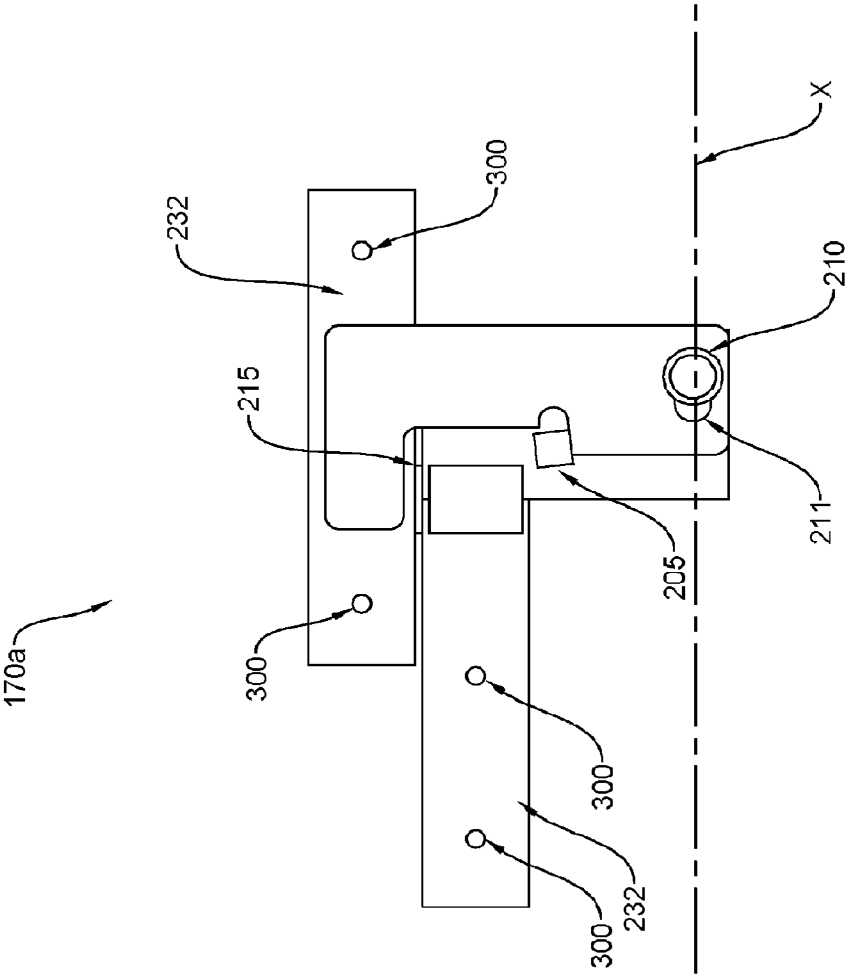
FIG. 16A is a side view of a hinge assembly used in an assembly.

FIGS. 16A-16B is an enlarged view of hinge assembly 170*a*, 170*b*. Hinge assembly 170*a*, 170*b* show the two end couplings 232, hinge 160, pin 210 before being fitted to the elongate members 130 and the cross members 143, 146. Hinge assembly 170*a*, 170*b* is made in a left variant 170*a* and a right variant 170*b* which are mirror images of each other. This allows the locking mechanism and hinge 160 to be assessable from the exterior rather than the interior of a vehicle.

The assemblies 100, 101, 102 are modular in nature and can be assembled at the site of a user or in a factory before sale. Sizing of elongate members and cross members to different vehicles allow the invention to be widely used. A user may be informed of coupling and actuator mount dimensions and then purchase members that will correctly engage the couplings and mount.

Although the invention has been described with reference to specific examples, it will be appreciated by those skilled in the art that the invention may be embodied in many other forms.

The invention claimed is:

1. An assembly to be mounted on a vehicle to support a load receiving body on the vehicle, the vehicle having a forward direction of travel with the load receiving body being tiltable, the assembly including:

a primary frame, having a longitudinal axis, that is to be attached to the vehicle;

a secondary frame extending between the primary frame and to be attached to the load receiving body;

a hinge pivotally attaching the primary frame to the secondary frame for angular movement about a pivot axis that is transverse to the longitudinal axis so that the secondary frame is movable between a lowered position and a raised position, the lowered position having the secondary frame adjacent to the primary frame and the raised position having the secondary frame raised at an acute angle at the hinge;

a first actuator pivotally attached to a portion on the primary frame and pivotally attached to the secondary frame and operable to cause angular movement of the secondary frame about the pivot axis; and a second actuator attached to the portion on the primary frame and mounted to primary frame, and operable to cause movement of the portion in a direction generally parallel to the longitudinal axis.

2. The assembly of claim 1, wherein the longitudinal axis is generally parallel to the forward direction of travel.

3. The assembly of claim 1, wherein the pivot axis is generally transverse to the forward direction of travel.

4. The assembly of claim 1, wherein the primary frame further includes a slidable cross member in which the portion is attached.

5. The assembly of claim 4, wherein the slidable cross member travels parallel to the longitudinal axis.

6. The assembly of claim 1, wherein the primary frame and the secondary frame each comprise two or more elongate members and a plurality of cross members.

7. The assembly of claim 6, wherein the cross members are spaced from each other and are situated between the elongate members.

8. The assembly of claim 6, wherein the plurality of cross members and elongate members of the primary and secondary frame are connected by couplings.

9. An assembly to be mounted on a vehicle to support a load receiving body on the vehicle, the vehicle having a forward direction of travel with the load receiving body being tiltable, the assembly including:

a primary frame, having a longitudinal axis, that is to be attached to the vehicle;

a secondary frame extending between the primary frame and to be attached to the load receiving body;

a hinge pivotally attaching the primary frame to the secondary frame for angular movement about a pivot axis that is transverse to the longitudinal axis so that the secondary frame is movable between a lowered position and a raised position, the lowered position having the secondary frame adjacent to the primary frame and the raised position having the secondary frame raised at an acute angle at the hinge;

a first actuator pivotally attached to a portion on the primary frame and pivotally attached to the secondary frame, and operable to cause angular movement of the secondary frame;

a second actuator attached to the portion on the primary frame and operable to cause movement of the portion in a direction generally parallel to the longitudinal axis; and a first catch portion attached to the primary frame and a second catch portion attached to the secondary frame;

wherein the secondary frame is movable longitudinally relative to the primary frame by operation of one or more of the first actuator and the second actuator between a locked position and a released position with the first and second catch portions engaged when in the locked position.

10. The assembly of claim 9, wherein the first catch portion includes a surface attached to the hinge and the second catch portion includes a projection located above the surface such that when the second frame is in the locked position the surface abuts the projection.

11. The assembly of claim 9, wherein the first catch portion is a plate attached to the assembly.

12. An assembly to be mounted on a vehicle to support a load receiving body on the vehicle, the vehicle having a forward direction of travel with the load receiving body being tiltable, the assembly including:

a primary frame, having a longitudinal axis, that is to be attached to the vehicle;

a secondary frame extending between the primary frame and to be attached to the load receiving body;

the primary frame and secondary frame being formed by a plurality of elongate members and cross members;

couplings attaching the cross members to their respective longitudinal members;

fasteners securing each coupling to its associated members;

a hinge pivotally attaching the primary frame to the secondary frame for angular movement about a pivot axis that is transverse to the longitudinal axis so that the secondary frame is movable between a lowered position and a raised position, the lowered position having the secondary frame adjacent to the primary frame and the raised position having the secondary frame raised at an acute angle at the hinge;

a first actuator pivotally attached to a portion on the primary frame and pivotally attached to the secondary frame, and operable to pivot the body between the lowered position and the raised position; and a second actuator attached to the portion on the primary frame and operable to cause movement of the portion in a direction generally parallel to the longitudinal axis.

* * * * *